US012288650B2

(12) United States Patent
Chou

(10) Patent No.: US 12,288,650 B2
(45) Date of Patent: Apr. 29, 2025

(54) TILT BALL SWITCH

(71) Applicant: Tien-Ming Chou, Taichung (TW)

(72) Inventor: Tien-Ming Chou, Taichung (TW)

( * ) Notice: Subject to any disclaimer, the term of this patent is extended or adjusted under 35 U.S.C. 154(b) by 0 days.

(21) Appl. No.: 18/370,668

(22) Filed: Sep. 20, 2023

(65) Prior Publication Data

US 2024/0128033 A1 Apr. 18, 2024

(30) Foreign Application Priority Data

Oct. 14, 2022 (TW) ................................. 111139138

(51) Int. Cl.

*H01H 1/16* (2006.01)
*H01H 1/58* (2006.01)
*H01H 35/02* (2006.01)

(52) U.S. Cl.

CPC ............ *H01H 1/16* (2013.01); *H01H 1/5833* (2013.01); *H01H 35/02* (2013.01)

(58) Field of Classification Search

CPC ........ H01H 1/16; H01H 1/5833; H01H 35/02; H01H 2221/058; H01H 35/00; H01H 35/14; H01H 35/141; H01H 35/145; H01H 2237/006; H01H 1/58; H01H 1/12; H01H 1/14

USPC ............................................ 200/61.52, 45 R

See application file for complete search history.

(56) References Cited

U.S. PATENT DOCUMENTS 7,446,272 B2 * 11/2008 Chou ..................... H01H 35/02 200/61.52
2007/0012552 A1 * 1/2007 Chou ....................... H01H 3/60 200/61.45 R

* cited by examiner

*Primary Examiner* — Anthony R Jimenez

(57) ABSTRACT

A tilt ball switch includes a cover, a first positioning unit, a plurality of conductive members, a conductive ball, a base wall, a surrounding wall that extends from a periphery of the base wall, and an opening that is formed at one end of the surrounding wall opposite to the base wall. The cover closes the opening, and cooperates with the base wall and the surrounding wall to define a receiving space. The first positioning unit is disposed in the receiving space, and is positioned between the base wall and the cover. The conductive ball is convertible between a conducting state, in which the conductive ball is in contact with at least two of the conductive members, and a non-conducting state, in which the conductive ball is spaced apart from the conductive members.

20 Claims, 29 Drawing Sheets

TILT BALL SWITCH

CROSS-REFERENCE TO RELATED APPLICATION

This application claims priority to Taiwanese Invention Patent Application No. 111139138, filed on Oct. 14, 2022, and incorporated by reference herein in its entirety.

FIELD

The disclosure relates to a switch, and more particularly to a tilt ball switch.

BACKGROUND

Referring to FIGS. 1 and 2, a conventional tilt ball switch 9 disclosed in Taiwanese Patent No. 1239025 includes an outer housing 91, four conductive members 92, a ball member 93, and a cover 94. The outer housing 91 is made of an electrical insulating material, and includes a base wall 95 and a peripheral wall 96 that extends from a periphery of the base wall 95. The base wall 95 and the peripheral wall 96 cooperatively define a receiving space 97 that has an opening 971. The base wall 95 has an outer surface 951, an inner surface 952, a plurality of through holes 953 that are arranged in an array and that extend from the outer surface 951 to the inner surface 952 such that the through holes 953 communicate with the receiving space 97, and a groove portion 954 that is formed in a central position of the inner surface 952 and that is conical. The conductive members 92 are made of a metal material, and respectively extend through the through holes 953 into the receiving space 97. The ball member 93 is made of a metal material, is located in the receiving space 97, and is received in the groove portion 954. The cover 94 is made of a plastic material, and closes the opening 971 of the outer housing 91 so that the ball member 93 is restrained from leaving the receiving space 97. When the conventional tilt ball switch 9 is inclined, the ball member 93 rolls relative to the groove portion 954 and comes into contact with two of the conductive members 92. At this time, the conventional tilt ball switch 9 is in a conducting state.

Though the conventional tilt ball switch 9 may be converted into the conducting state or a non-conducting state according to inclination thereof, it may be necessary to provide tilt ball switches with different structures to meet different user requirements.

SUMMARY

Therefore, an object of the disclosure is to provide a tilt ball switch that has a configuration different from the abovementioned prior art.

According to an aspect of the disclosure, the tilt ball switch includes an outer housing, a cover, a first positioning unit, a plurality of conductive members, and a conductive ball. The outer housing includes a base wall, a surrounding wall that extends from a periphery of the base wall, and an opening that is formed at one end of the surrounding wall opposite to the base wall. The cover closes the opening of the outer housing, and cooperates with the base wall and the surrounding wall to define a receiving space. The first positioning unit is disposed in the receiving space, and is positioned between the base wall and the cover. The conductive members extend through the cover into the receiving space. The conductive ball is movably disposed in the receiving space, and is convertible between a conducting state, in which the conductive ball is in contact with at least two of the conductive members, and a non-conducting state, in which the conductive ball is spaced apart from the conductive members. The first positioning unit is for positioning the conductive ball to keep the conductive ball in one of the conducting state and the non-conducting state.

According to another aspect of the disclosure, the tilt ball switch is adapted to be mounted to a circuit board, and includes an outer housing, a cover, a first positioning unit, a second positioning unit, a plurality of conductive members, and a conductive ball. The outer housing includes a base wall, a surrounding wall that surrounds the base wall, and an opening that is formed at one end of the surrounding wall opposite to the base wall. The cover includes a cover body that closes the opening of the outer housing and that is adapted to be mounted to the circuit board, and a plurality of through holes that are formed in the cover body. The cover body cooperates with the base wall and the surrounding wall to define a receiving space. The first positioning unit is disposed in the receiving space and abuts against the cover body. The second positioning unit is disposed in the receiving space, abuts against the first positioning unit and the base wall, and cooperates with the first positioning unit to define a chamber. The conductive members are adapted to be inserted into the circuit board, respectively extend through the through holes of the cover, and extend through the first positioning unit into the chamber. The conductive ball is movably disposed in the chamber, is in contact with one of the first positioning unit and the second positioning unit, and is convertible between a conducting state, in which the conductive ball is in contact with at least two of the conductive members, and a non-conducting state, in which the conductive ball is not in contact with any two of the conductive members simultaneously.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
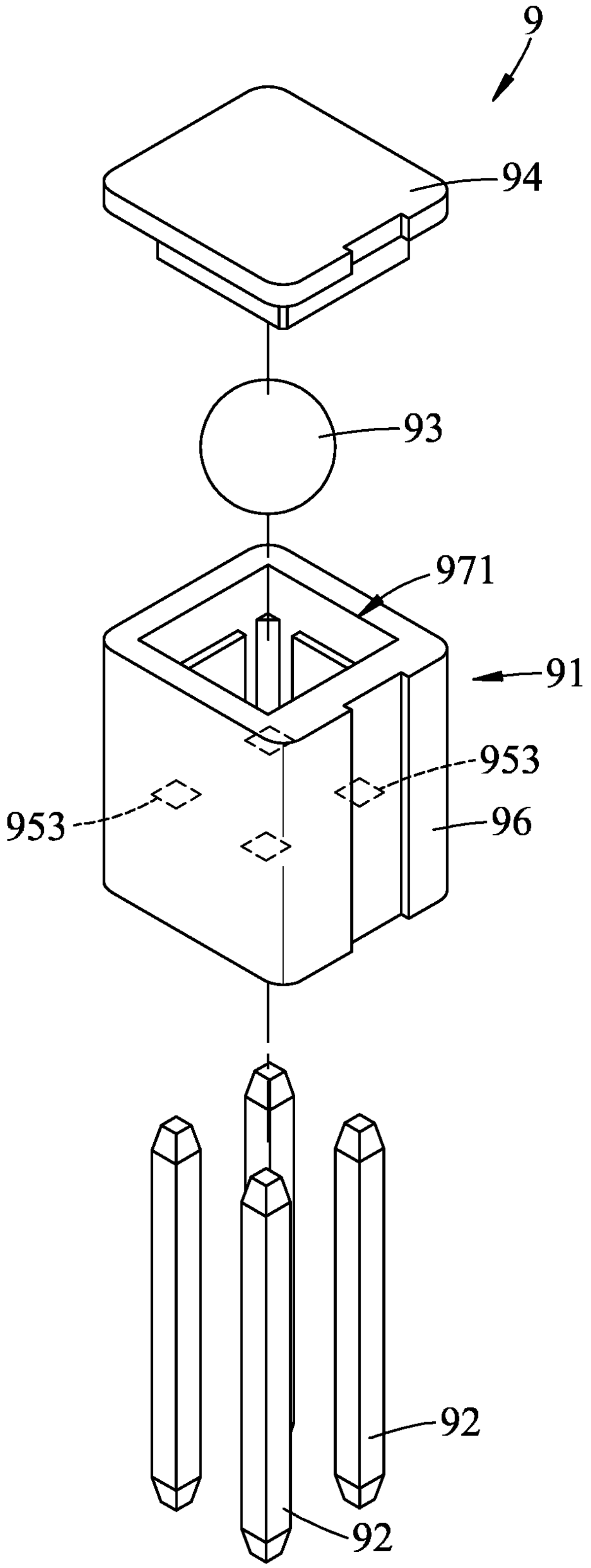
FIG.1 PRIOR ART
FIG. 1 is an exploded perspective view of a conventional tilt ball switch disclosed in Taiwanese Patent No. 1239025.
Figure 2:
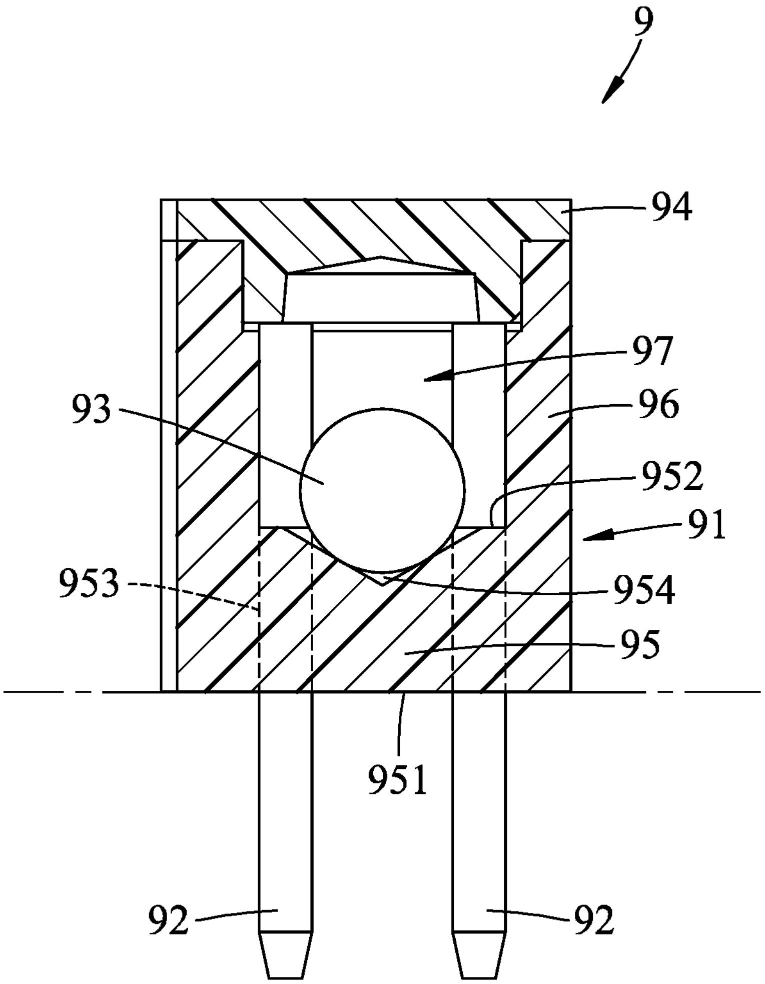
FIG.2 PRIOR ART
FIG. 2 is a sectional view of the conventional tilt ball switch.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 3:
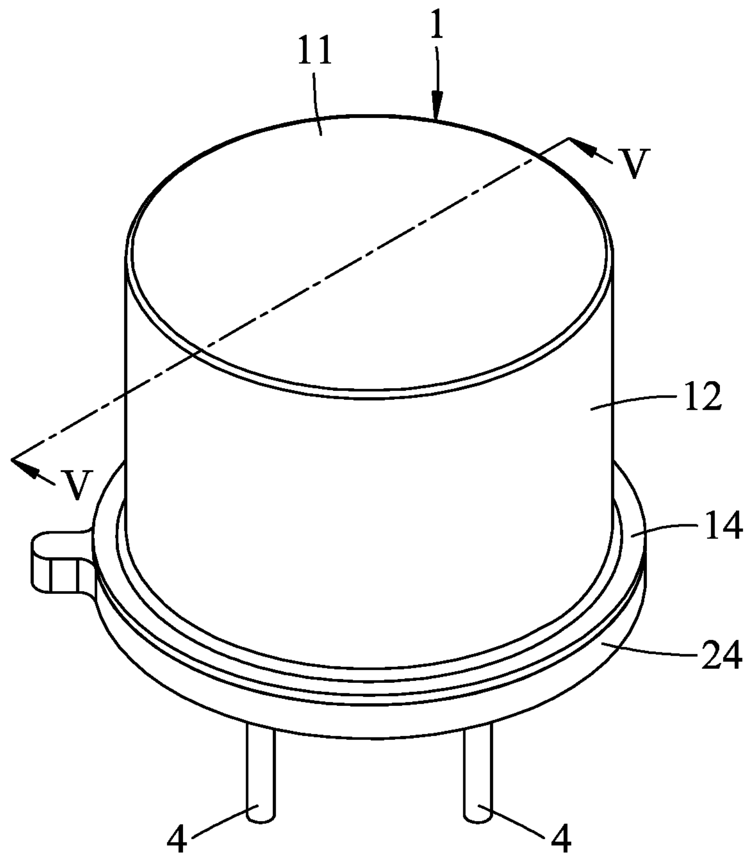
FIG. 3 is a perspective view of a first embodiment of a tilt ball switch according to the disclosure.
Figure 4:
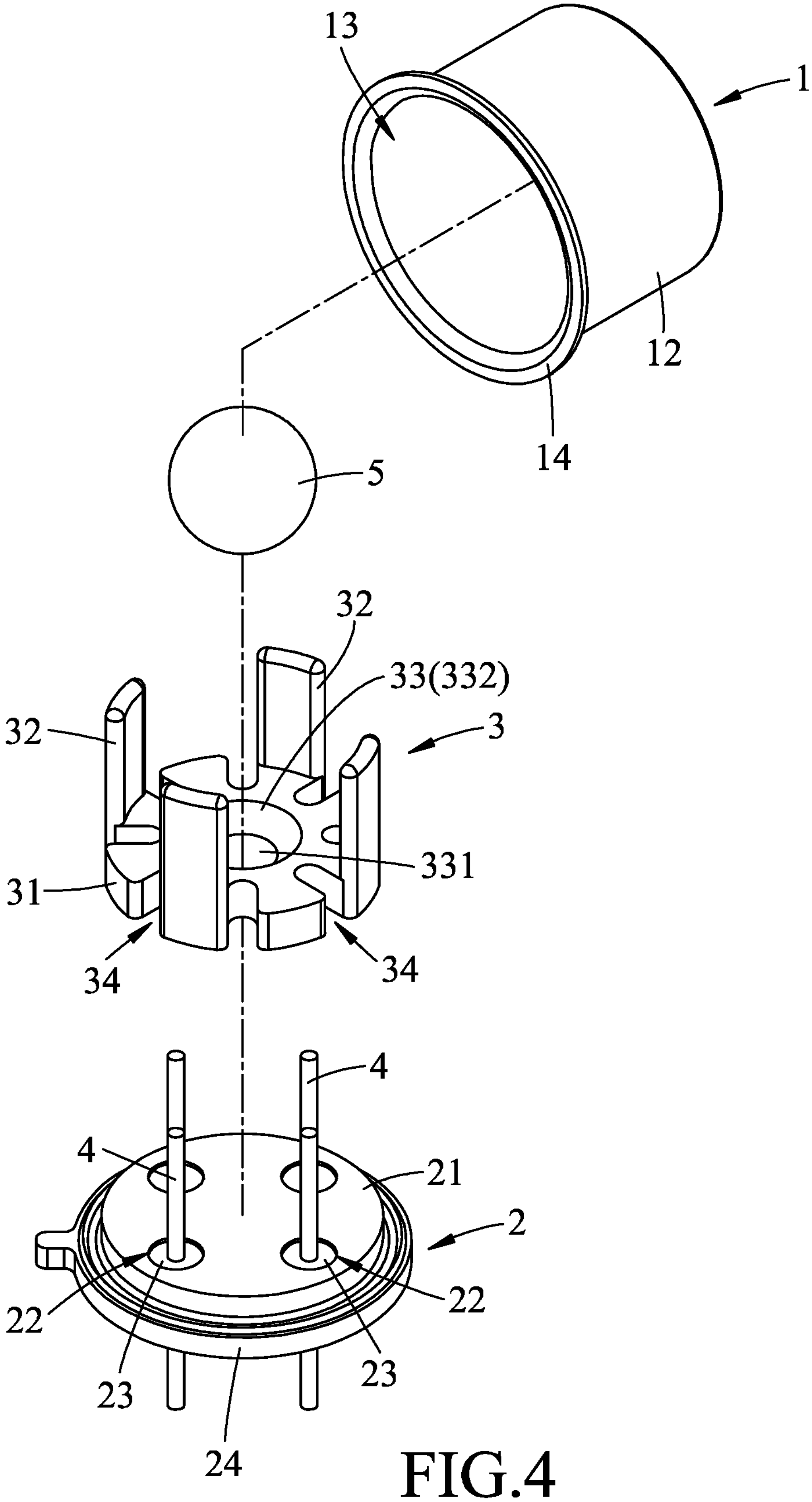
FIG. 4 is a partly exploded perspective view of the first embodiment.

Referring to FIGS. 3 and 4, a first embodiment of a tilt ball switch according to the disclosure includes an outer housing 1, a cover 2, a first positioning unit 3, four conductive members 4 that are arranged in an array, and a conductive ball 5.

The outer housing 1 is made of an electrical insulating material. In the first embodiment, the outer housing 1 is made of a plastic material. The outer housing 1 includes a base wall 11, a surrounding wall 12 that extends from a periphery of the base wall 11, an opening 13 that is formed at an end of the surrounding wall 12 opposite to the base wall 11, and a protruding flange 14 that extends outwardly from a periphery of the surrounding wall 12 proximate to the opening 13.

The cover 2 is made of a metal material, and includes a cover body 21, four through holes 22, four sealing members 23, and an abutting wall 24. The cover body 21 closes the opening 13 of the outer housing 1. The through holes 22 are formed in the cover body 21, are arranged in an array, and respectively correspond in position to the conductive members 4. The sealing members 23 are respectively mounted to the through holes 22. The conductive members 4 respectively extend through the sealing members 23 (i.e., the conductive members 4 respectively extend through the through holes 22). The abutting wall 24 extends outwardly from a periphery of the cover body 21, corresponds in position to the protruding flange 14, and is coupled to the protruding flange 14. The cover body 21 cooperates with the base wall 11 and the surrounding wall 12 to define a receiving space 211.

It is noted that each of the sealing members 23 is configured to be a glass insulator, and is mounted to the respective through hole 22 and the respective conductive member 4 via glass-to-metal sealing technology so that the sealing members 23 and the conductive members 4 may seal the cover body 21. The protruding flange 14 and the abutting wall 24 are coupled to each other by a resistance welding process. The tilt ball switch achieves airtightness and watertightness via the glass-to-metal sealing technology and the resistance welding process.

The first positioning unit 3 is disposed in the receiving space 211, is positioned between the base wall 11 and the cover 2, and has a first main portion 31, four arm portions 32, a first positioning portion 33, and a plurality of guiding portions 34. The first main portion 31 abuts against the cover body 21. The arm portions 32 extend from a periphery of the first main portion 31 and abut against the base wall 11. The first positioning portion 33 is recessed from an upper surface of the first main portion 31 opposite to the cover body 21. The guiding portions 34 surround the first positioning portion 33, and are formed in the periphery of the first main portion 31. The conductive members 4 extend through the guiding portions 34. In the first embodiment, the tilt ball switch includes four conductive members 4, and the first positioning unit 3 has eight guiding portions 34. The conductive members 4 respectively extend through four of the guiding portions 34. The first positioning portion 33 has a platform surface 331, and a frustoconical surface 332 that extends upwardly from the platform surface 331 to the upper surface of the first main portion 31 and that tapers downwardly from the upper surface of the first main portion 31 to the platform surface 331.

Each of the conductive members 4 is made of a metal material. The conductive members 4 respectively extend through the sealing members 23 into the receiving space 211, and extend through the guiding portions 34 such that the conductive members 4 surround the first positioning portion 33.

The conductive ball 5 is made of a metal material, and is movably disposed in the receiving space 211.

Figure 5:
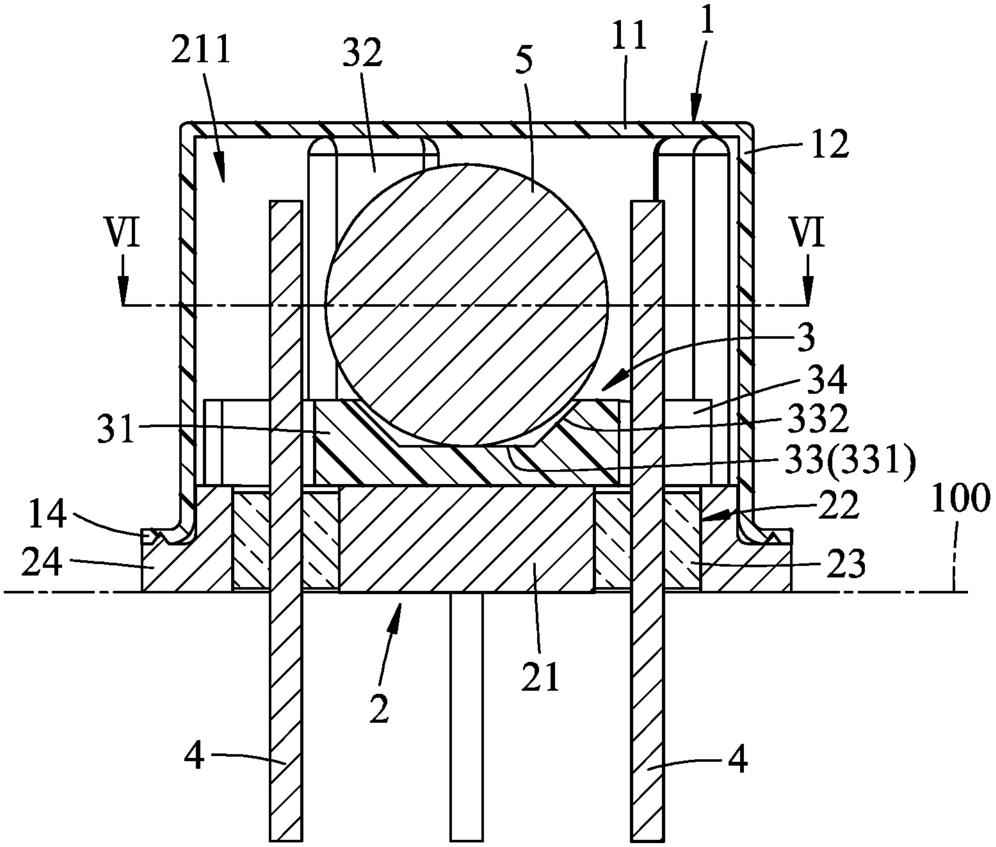
FIG. 5 is a sectional view taken along line V-V in FIG. 3 illustrating a conductive ball of the first embodiment in a non-conducting state.
Figure 6:
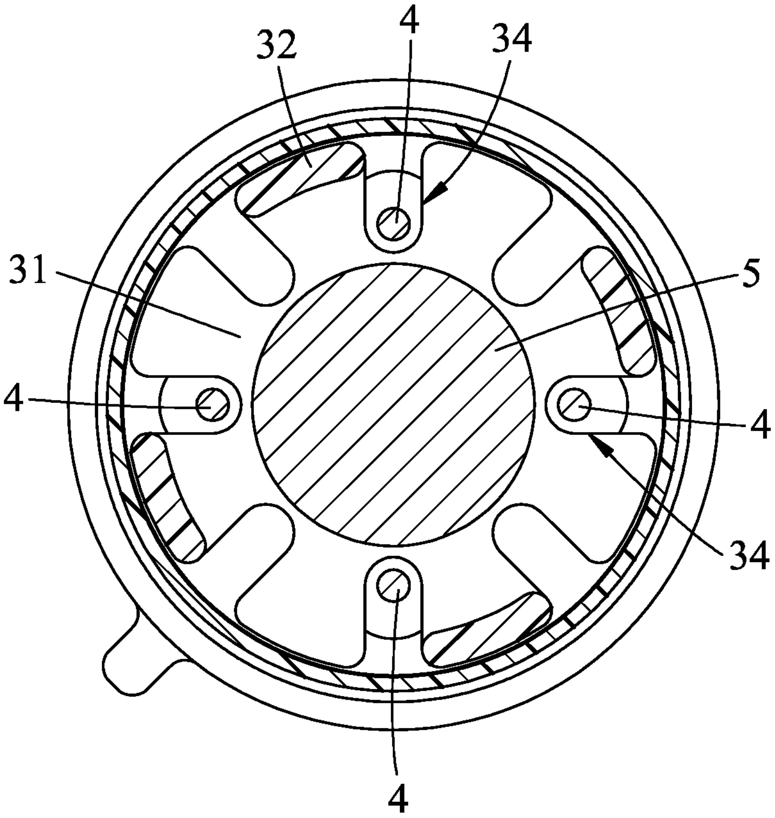
FIG. 6 is a sectional view taken along line VI-VI in FIG. 5.
Figure 7:
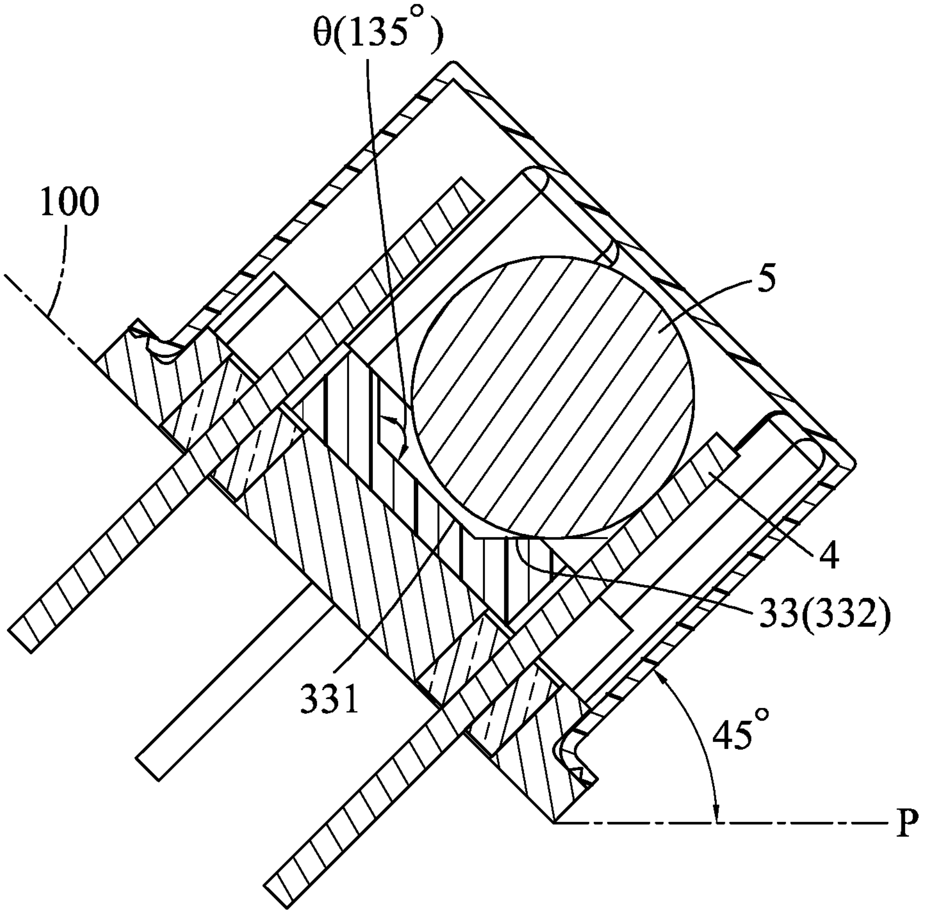
FIG. 7 is a view similar to FIG. 5, but illustrating the conductive ball in a conducting state.

Referring to FIGS. 5 to 7, the conductive ball 5 is convertible between a non-conducting state, in which the conductive ball 5 is positioned by the first positioning portion 33 so that the conductive ball 5 is spaced apart from the conductive members 4 (see FIGS. 5 and 6), and a conducting state, in which the conductive ball 5 is moved relative to the first positioning portion 33 and is in contact with two of the conductive members 4 (see FIG. 7).

It is noted that, in one embodiment, the tilt ball switch may include more than one conductive ball 5 and may have more than one first positioning portion 33, and the size of each of the conductive balls 5 and the size of each of the first positioning portions 33 may be adjusted according to actual requirements. That is to say, the numbers of the conductive balls 5 and the first positioning portions 33 are not limited to one.

Referring to FIGS. 5 and 6 again, the tilt ball switch is adapted to be horizontally mounted to an object 100 when in use, and the object 100 may be a circuit board. At this time, the conductive ball 5 is received in the first positioning portion 33, and is spaced apart from the conductive members 4 (i.e., the conductive ball 5 is in the non-conducting state) such that the tilt ball switch is in a non-conducting state. Referring to FIG. 7 again, in the first embodiment, an angle (θ) between the frustoconical surface 332 and the platform surface 331 is configured to be 135 degrees. Therefore, when the tilt ball switch is tilted together with the object 100, the conductive ball 5 rolls relative to the first positioning portion 33, and the conductive ball 5 may roll away from the platform surface 331 when the tilt ball switch and the object 100 are tilted over 45 degrees with respect to a first imaginary horizontal plane (P). When the tilt ball switch is tilted over 45 degrees, the conductive ball 5 is in contact with two of the conductive members 4 (i.e., the conductive ball 5 is converted into the conducting state) such that the tilt ball switch is in a conducting state. Moreover, by virtue of the conductive members 4 being arranged in the array, when the tilt ball switch is in the conducting state, an orientation in which the tilt ball switch is tilted may be detected by detecting which two of the conductive members 4 are the conductive members 4 that the conductive ball 5 is in contact with.

In certain embodiments, the angle (θ) between the platform surface 331 and the frustoconical surface 332 may not be limited to 135 degrees, and may be adjusted according to actual requirements. If the angle (θ) is smaller than 135 degrees, in order to convert the tilt ball switch into the conducting state, the object 100 and the tilt ball switch have to be tilted over a tilt angle that is greater than 45 degrees. If the angle (θ) is greater than 135 degrees, the tilt ball switch will be converted into the conducting state when the object 100 and the tilt ball switch are tilted over a tilt angle that is smaller than 45 degrees. Therefore, sensitivity of the tilt ball switch may be adjusted by adjusting the angle (θ) between the platform surface 331 and the frustoconical surface 332.

Figure 8:
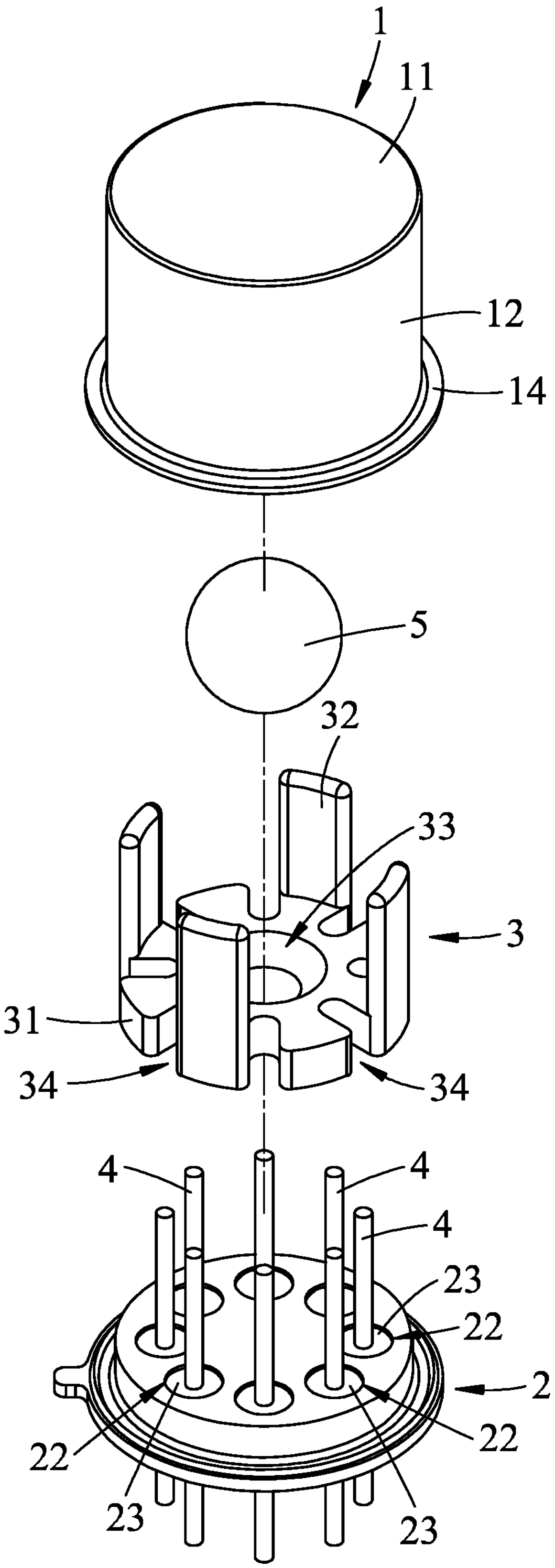
FIG. 8 is a partly exploded perspective view of a second embodiment of the tilt ball switch according to the disclosure.

Referring to FIG. 8, a second embodiment of the tilt ball switch according to the disclosure is similar to the first embodiment except that, in the second embodiment, the number of the conductive members 4 is eight, and the cover 2 has eight through holes 22 and eight sealing members 23. Since two adjacent ones of the conductive members 4 that are in contact with the conductive ball 5 may define one orientation, when the conductive ball 5 is in the conducting state, an orientation in which the tilt ball switch is tilted may be detected more precisely.

Figure 9:
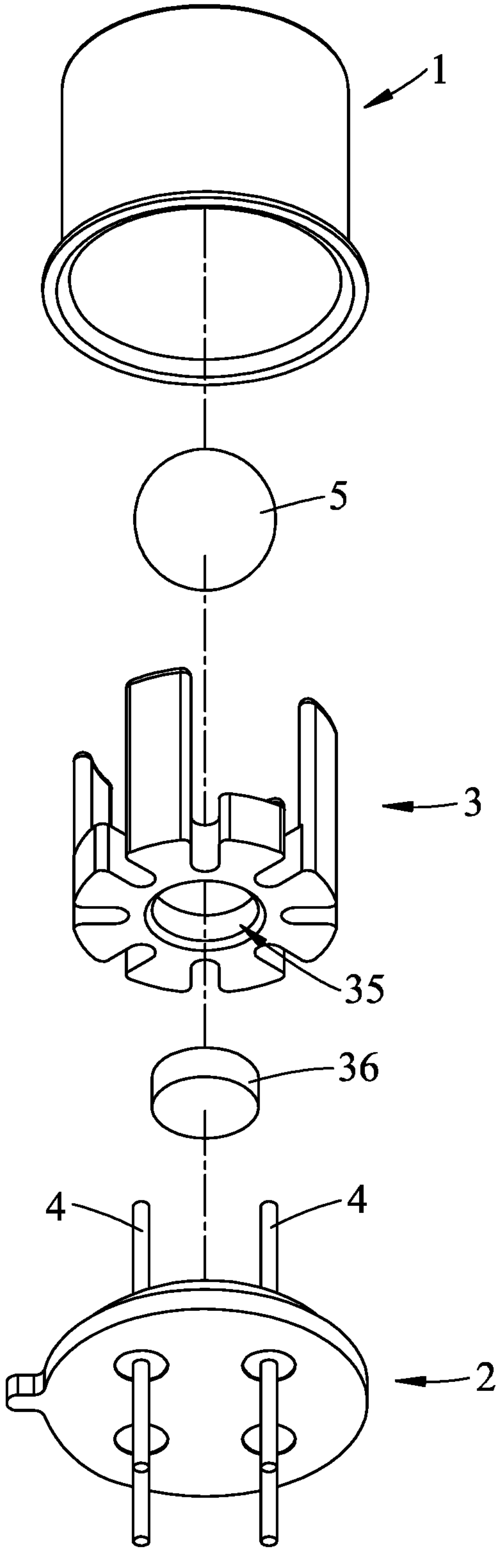
FIG. 9 is a partly exploded perspective view of a third embodiment of the tilt ball switch according to the disclosure.
Figure 10:
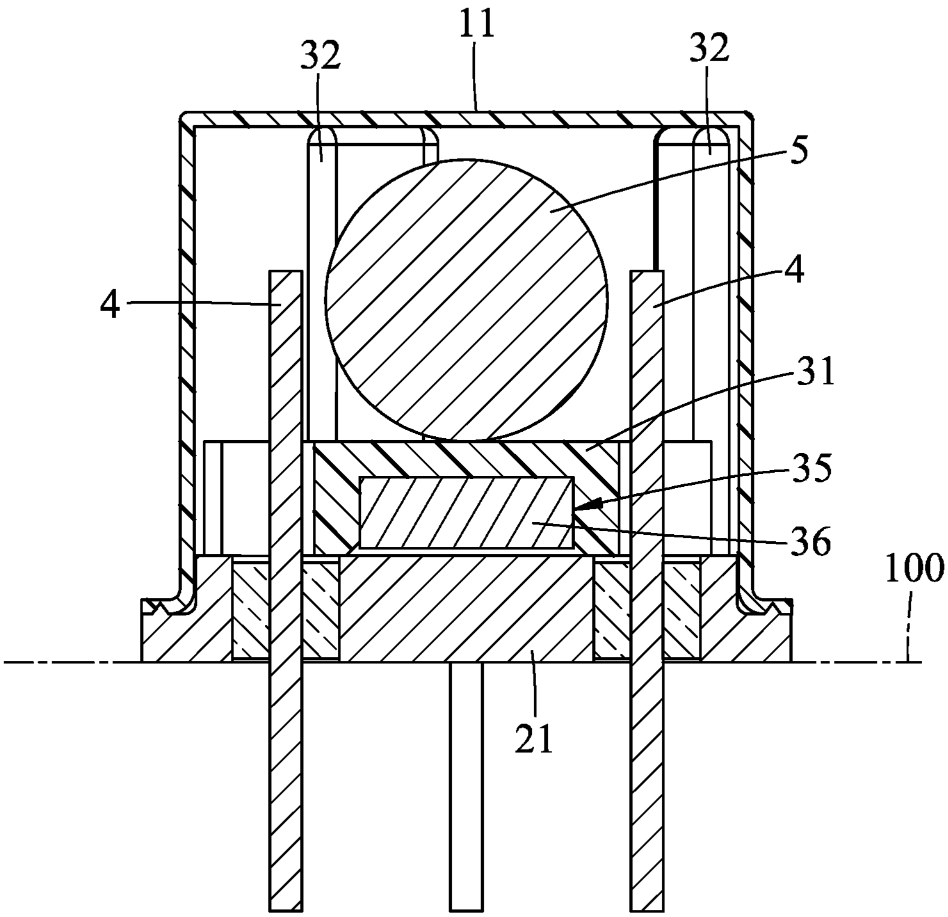
FIG. 10 is a sectional view of the third embodiment.

Referring to FIGS. 9 and 10, a third embodiment of the tilt ball switch according to the disclosure is generally similar to the first embodiment, but includes a different configuration of the first positioning unit 3.

In the third embodiment, the first positioning portion 33 of the first positioning unit 3 is omitted such that the upper surface of the first main portion 31 is flat. The conductive ball 5 is disposed on the upper surface of the first main portion 31. The first positioning unit 3 further has an accommodating portion 35 that is formed at a surface of the first main portion 31 opposite to the conductive ball 5 and the upper surface of the first main portion 31, and that is located at a center of the first main portion 31 (i.e., the guiding portions 34 surround the accommodating portion 35), and a magnetic member 36 that is disposed on the accommodating portion 35 and that attracts the conductive ball 5. When the conductive ball 5 is in the non-conducting state, the conductive ball 5 is attracted by the magnetic member 36 such that the conductive ball 5 abuts against the upper surface of the first main portion 31 and is spaced apart from the conductive members 4. When the conductive ball 5 is in the conducting state, the conductive ball 5 is moved against attraction force of the magnetic member 36, and is in contact with two of the conductive members 4.

Referring to FIG. 10 again, when the tilt ball switch is horizontally mounted to the object 100, and when the object 100 and the tilt ball switch are not affected by an external force, the conductive ball 5 is attracted by the magnetic member 36 and is in the non-conducting state such that the tilt ball switch is in the non-conducting state. When the tilt ball switch is affected by an external force, the conductive ball 5 is moved against the attraction force of the magnetic member 36 and is in contact with two of the conductive members 4 such that the conductive ball 5 and the tilt ball switch are in the conducting state.

When the attraction force of the magnetic member 36 is stronger, in order to convert the tilt ball switch into the conducting state, it is necessary to exert a greater external force on the tilt ball switch to urge the conductive ball 5 to move against the attraction force of the magnetic member 36. If the attraction force of the magnetic member 36 is weaker, the tilt ball switch may be converted into the conducting state when a smaller external force is exerted thereon. Therefore, the sensitivity of the tilt ball switch may be adjustable by adjust the attraction force of the magnetic member 36.

Figure 11:
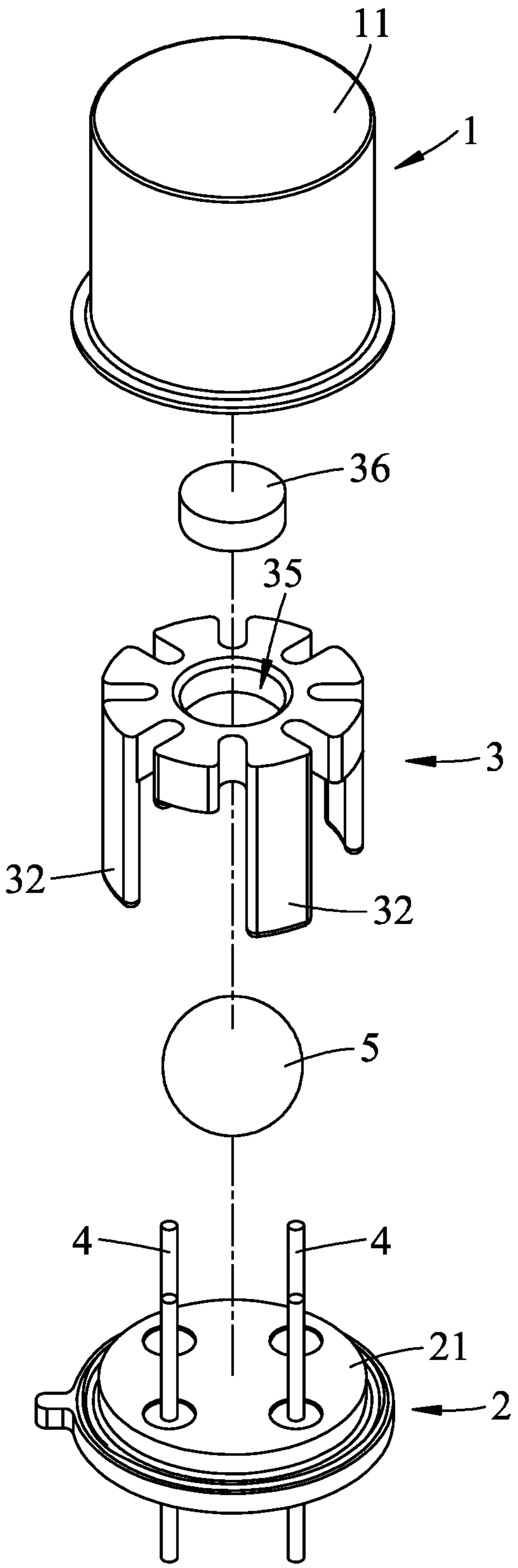
FIG. 11 is a partly exploded perspective view of a fourth embodiment of the tilt ball switch according to the disclosure.
Figure 12:
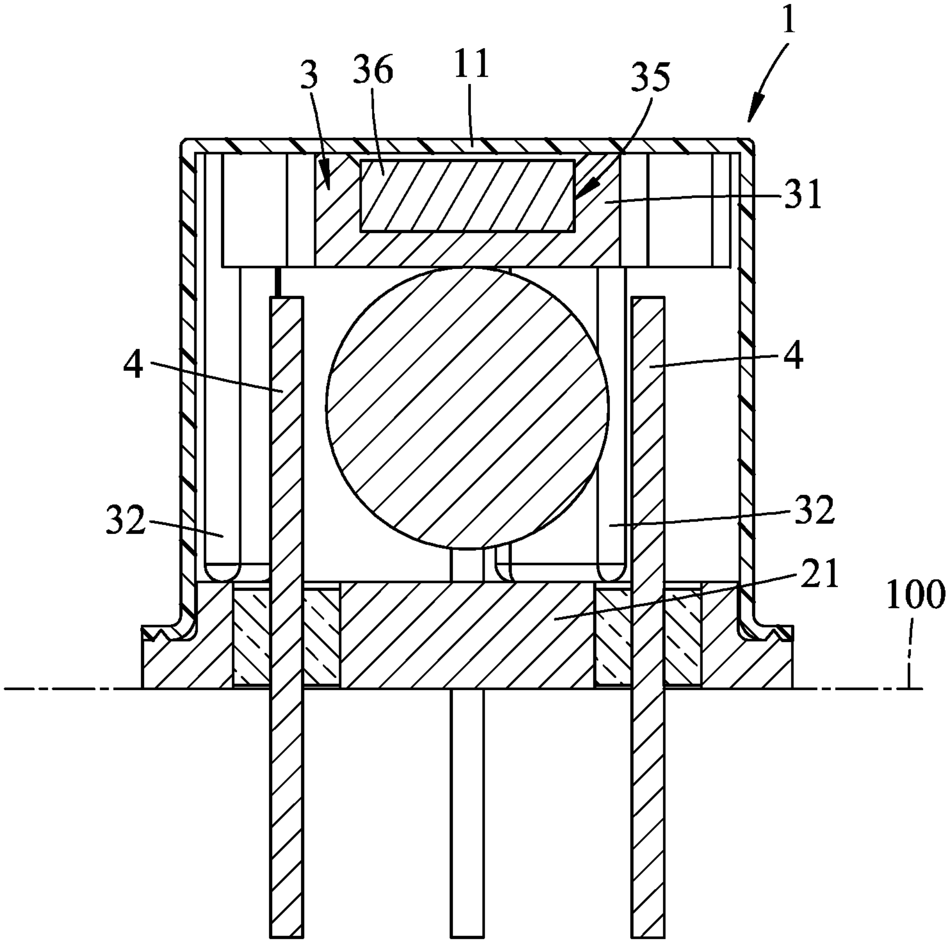
FIG. 12 is a sectional view of the fourth embodiment.

Referring to FIGS. 11 and 12, a fourth embodiment of the tilt ball switch according to the disclosure is generally similar to the third embodiment except that, the first positioning unit 3 in the fourth embodiment is oriented inversely compared to the first positioning unit 3 in the third embodiment. In the third embodiment, the first main portion 31 abuts against the cover body 21, the arm portions 32 extend from the first main portion 31 and abut against the base wall 11, and the accommodating portion 35 is adjacent to the cover body 21. In the fourth embodiment, the first main portion 31 abuts against the base wall 11, the arm portions 32 extend from the first main portion 31 and abut against the cover body 21, and the accommodating portion 35 is adjacent to the base wall 11. In the third embodiment, when the conductive ball 5 is in the non-conducting state, the conductive ball 5 is spaced apart from the base wall 11 by gravity and the attraction force of the magnetic member 36.

In the fourth embodiment, when the conductive ball 5 is in the non-conducting state, the conductive ball 5 is spaced apart from the cover body 21 by the attraction force of the magnetic member 36.

Figure 13:
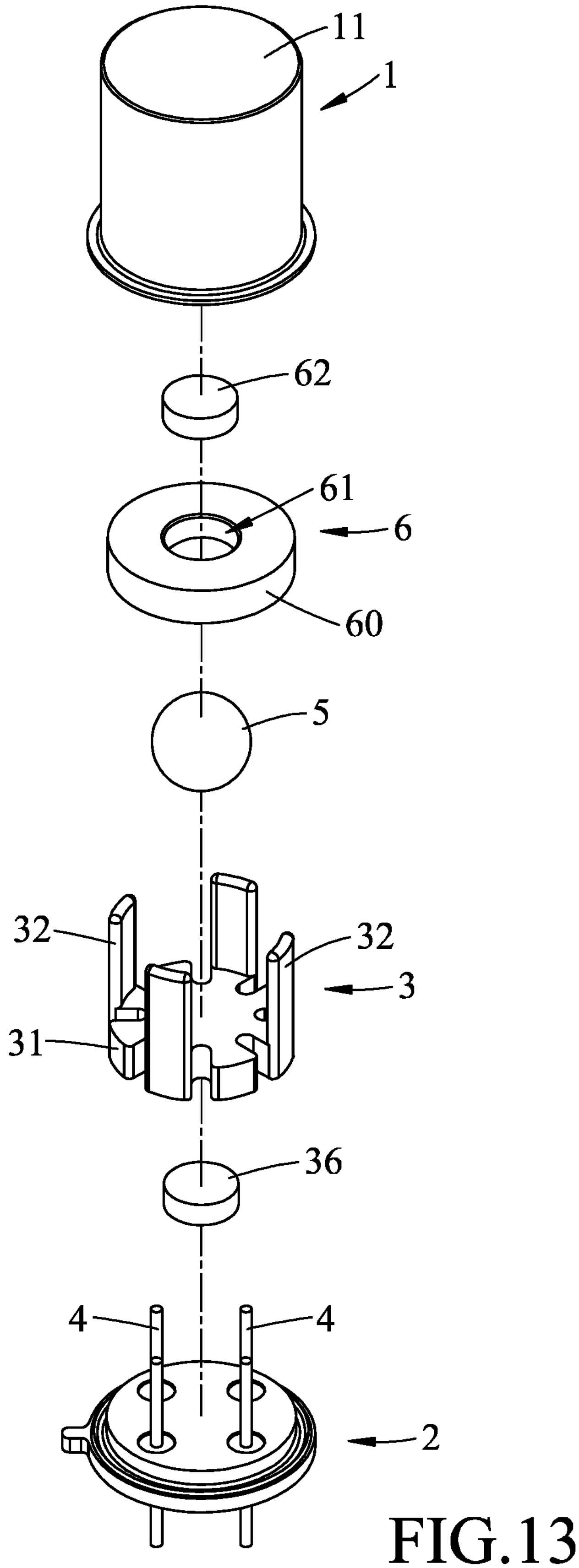
FIG. 13 is a partly exploded perspective view of a fifth embodiment of the tilt ball switch according to the disclosure.
Figure 14:
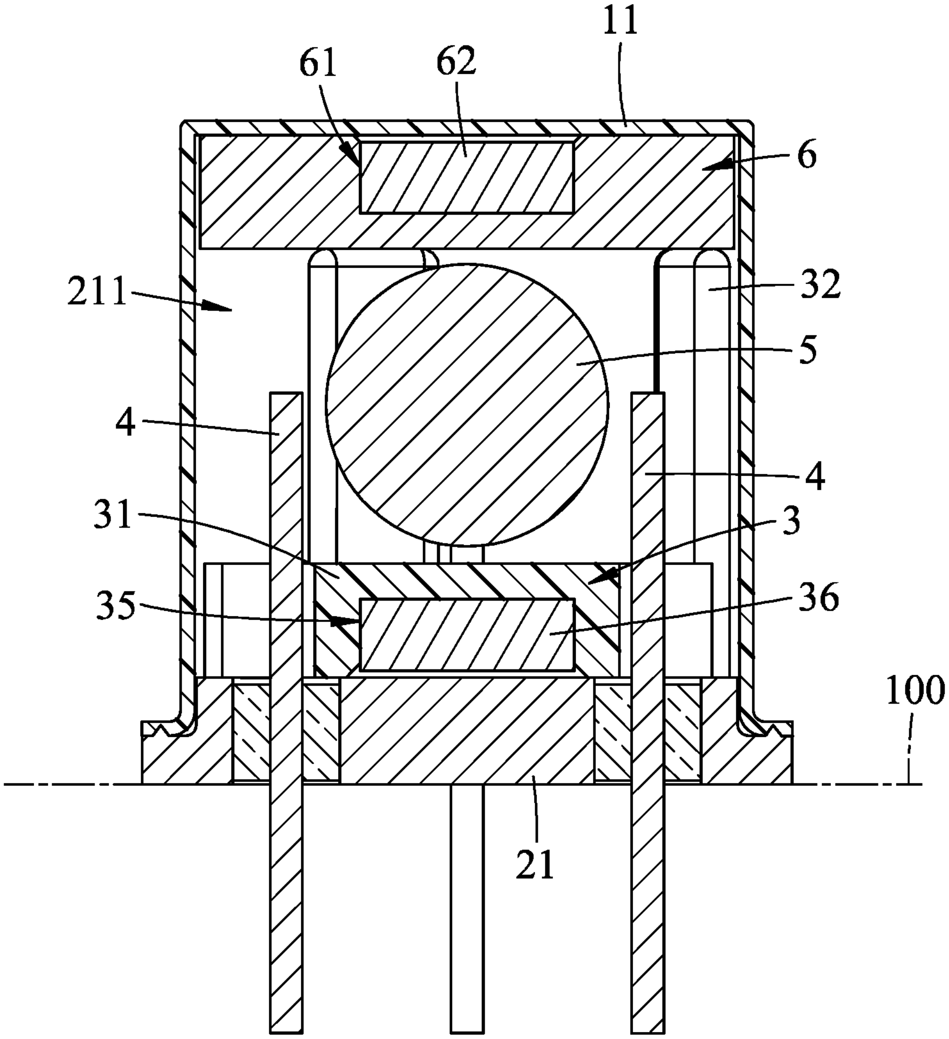
FIG. 14 is a sectional view of the fifth embodiment.

Referring to FIGS. 13 and 14, a fifth embodiment of the tilt ball switch according to the disclosure is generally similar to the third embodiment, but further includes a separating unit 6. The separating unit 6 is disposed in the receiving space 211, and abuts against the base wall 11. The separating unit 6 includes a separating member 60 that has a receiving section 61 which is formed at a center of a surface thereof opposite to the conductive ball 5, and a magnetic member 62 that is disposed on the receiving portion 61. The magnetic member 36 of the first positioning unit 3 and the magnetic member 62 of the separating unit 6 correspond in position to each other in an up-down direction. In the fifth embodiment, the first main portion 31 abuts against the cover body 21 and is located at one side of the conductive ball 5 opposite to the separating unit 6, and the arm portions 32 extend from the first main portion 31 and abut against the separating unit 6. In one embodiment, assembly of the first positioning unit 3 and the separating unit 6 may be oriented inversely relative to the outer housing 1 and the cover 2.

When the conductive ball 5 is in the non-conducting state, the conductive ball 5 is suspended between the first main portion 31 and the separating unit 6 by attraction force of the magnetic member 62 of the separating unit 6 and the attraction force of the magnetic member 36 of the first positioning unit 3, and is spaced apart from the conductive members 4. When the conductive ball 5 is in the conducting state, the conductive ball 5 is moved against the attraction forces of the magnetic members 36, 62, and is in contact with two of the conductive members 4.

Referring to FIG. 14 again, when the tilt ball switch is horizontally mounted to the object 100, and when the object 100 and the tilt ball switch are not affected by an external force, the conductive ball 5 is attracted by the magnetic members 36, 62, and is in the non-conducting state such that the tilt ball switch is in the non-conducting state. When the tilt ball switch is affected by an external force, the conductive ball 5 is moved against the attraction forces of the magnetic members 36, 62, and is in contact with two of the conductive members 4 such that the conductive ball 5 and the tilt ball switch are in the conducting state.

Therefore, the fifth embodiment may achieve the same purpose and effects as the third embodiment.

Figure 15:
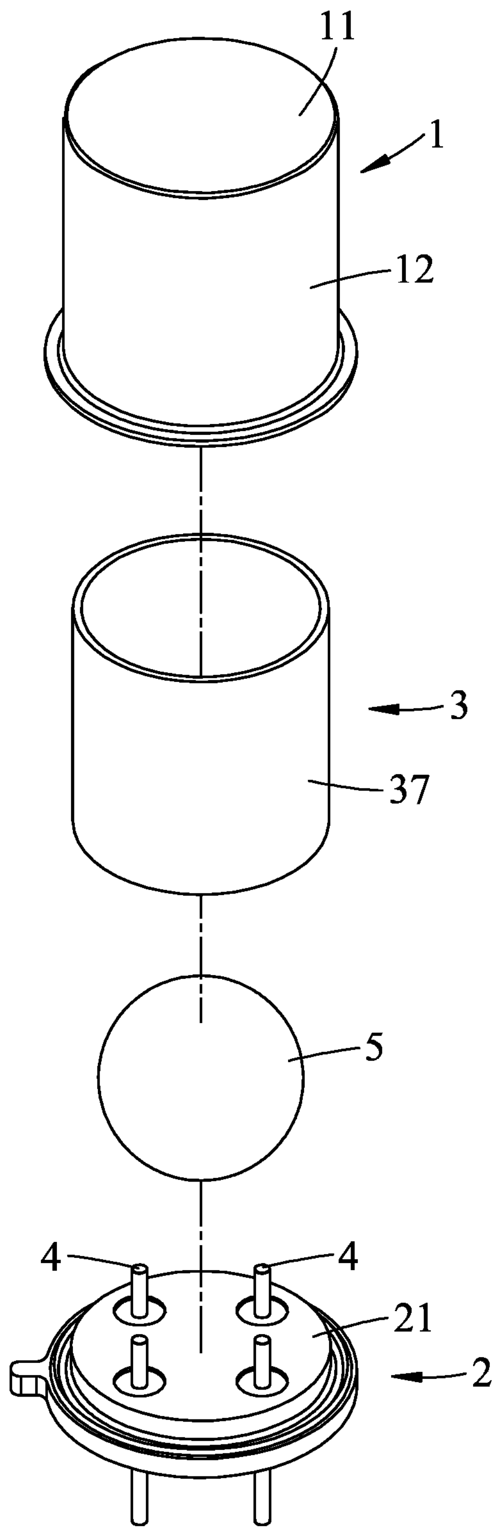
FIG. 15 is a partly exploded perspective view of a sixth embodiment of the tilt ball switch according to the disclosure.
Figure 16:
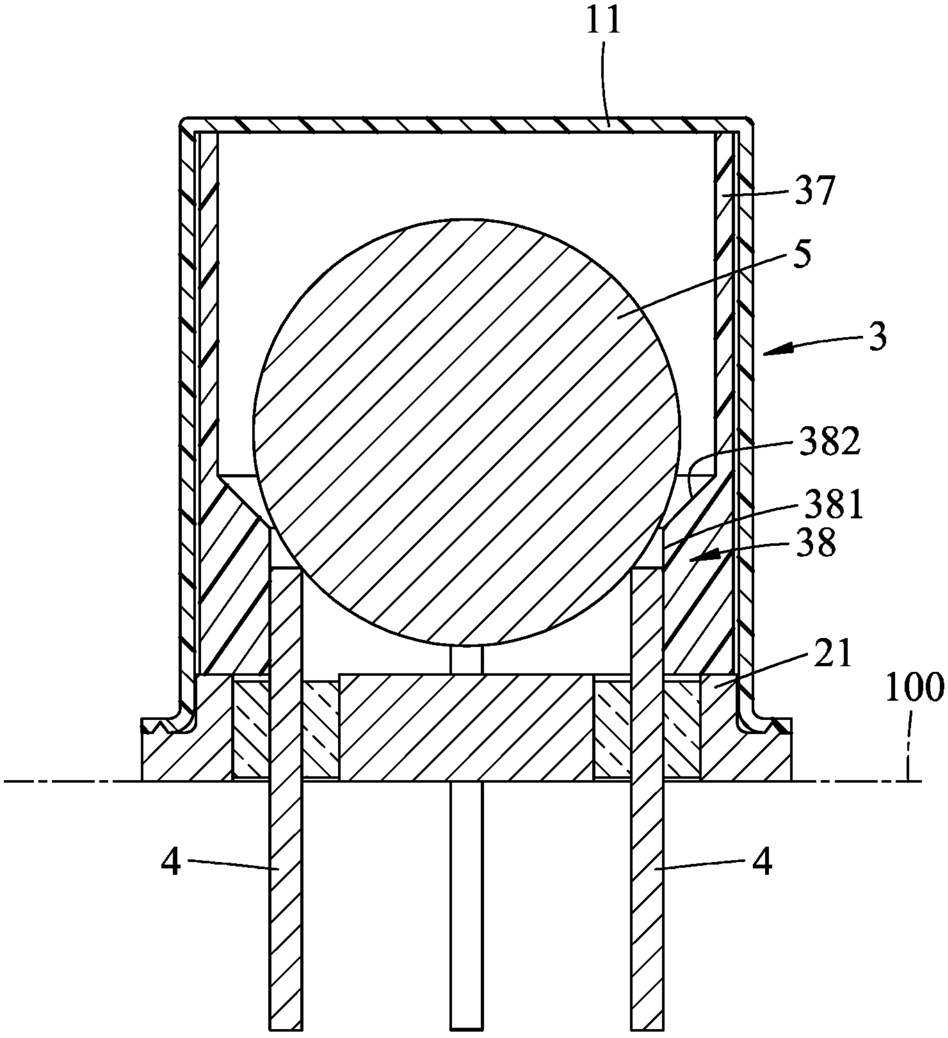
FIG. 16 is a sectional view of the sixth embodiment illustrating a conductive ball of the sixth embodiment in a conducting state.
Figure 17:
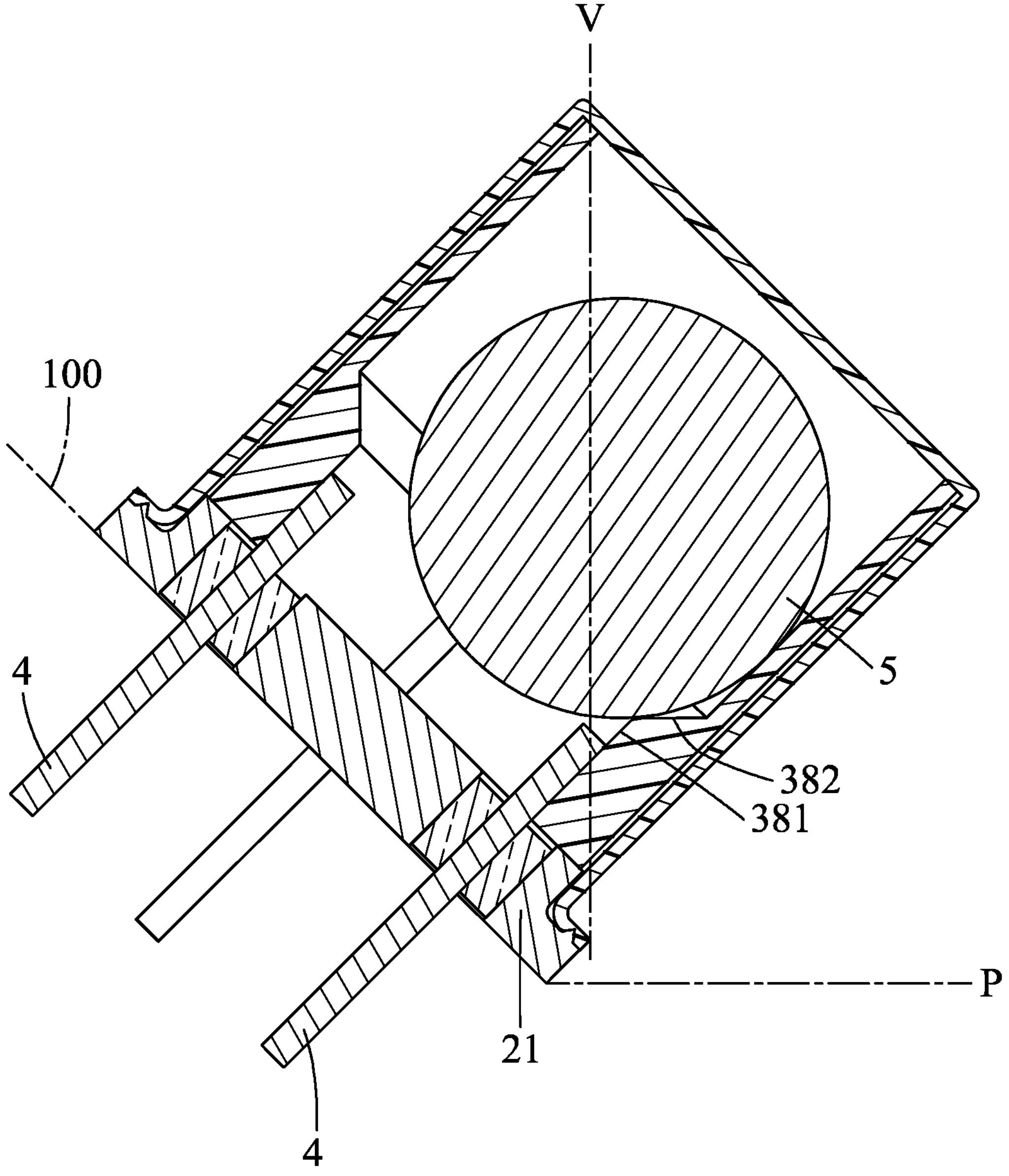
FIG. 17 is a view similar to FIG. 16, but illustrating the conductive ball in a non-conducting state.
Figure 18:
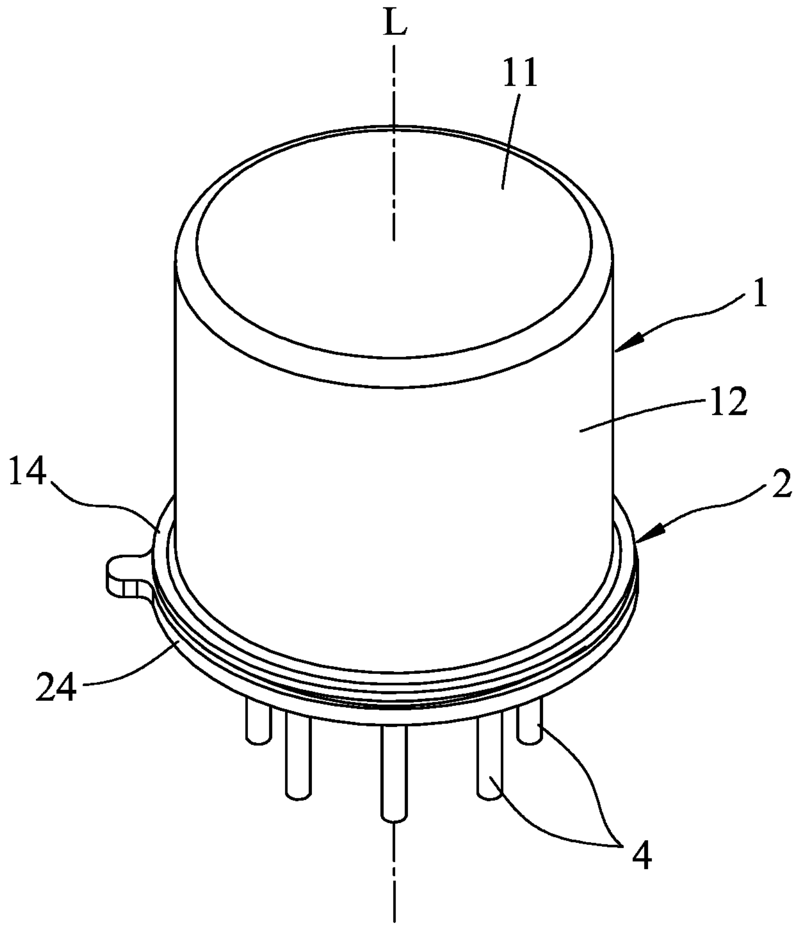
FIG. 18 is a perspective view of a seventh embodiment of the tilt ball switch according to the disclosure.
Figure 19:
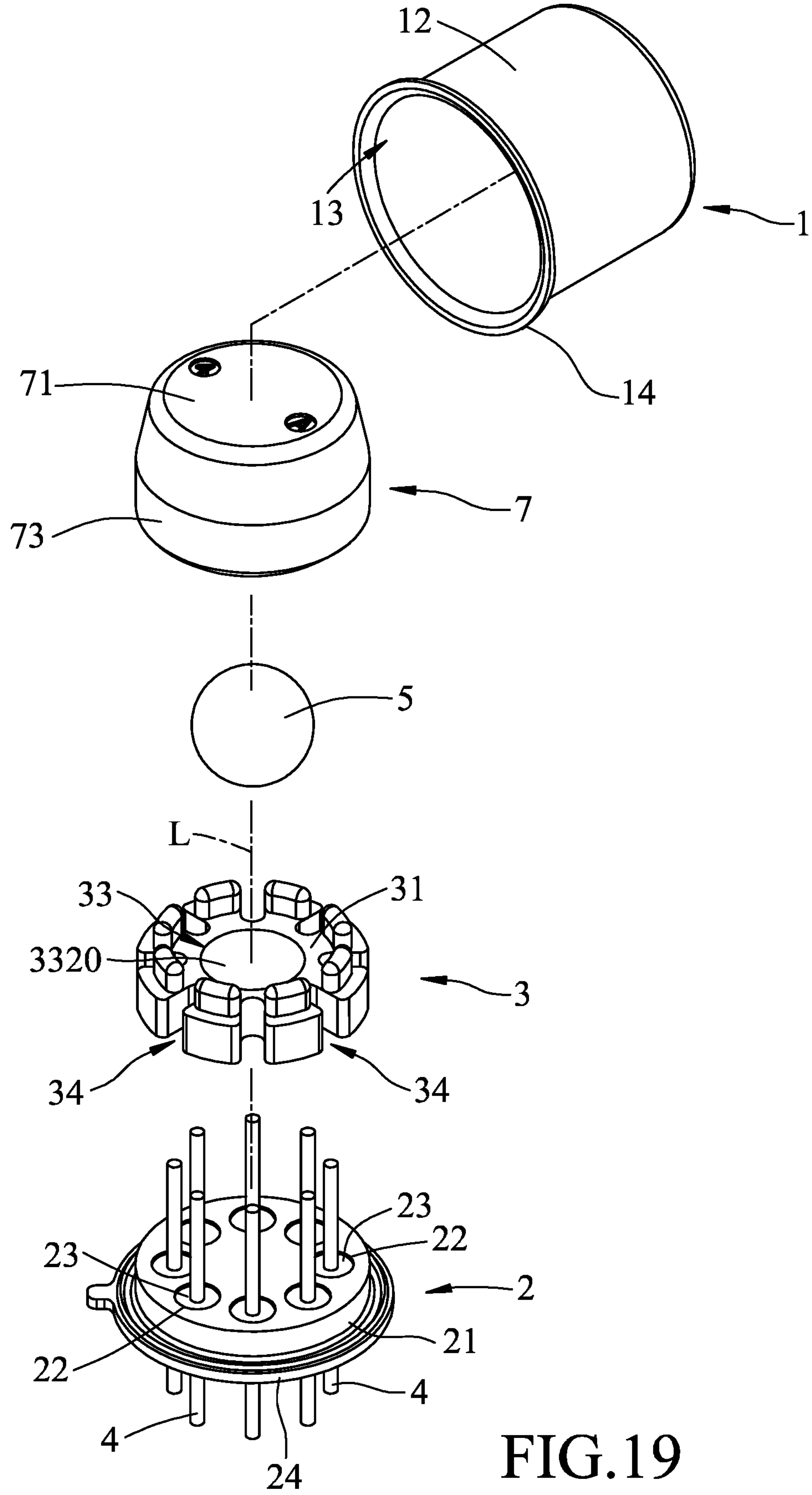
FIG. 19 is a partly exploded perspective view of the seventh embodiment.
Figure 20:
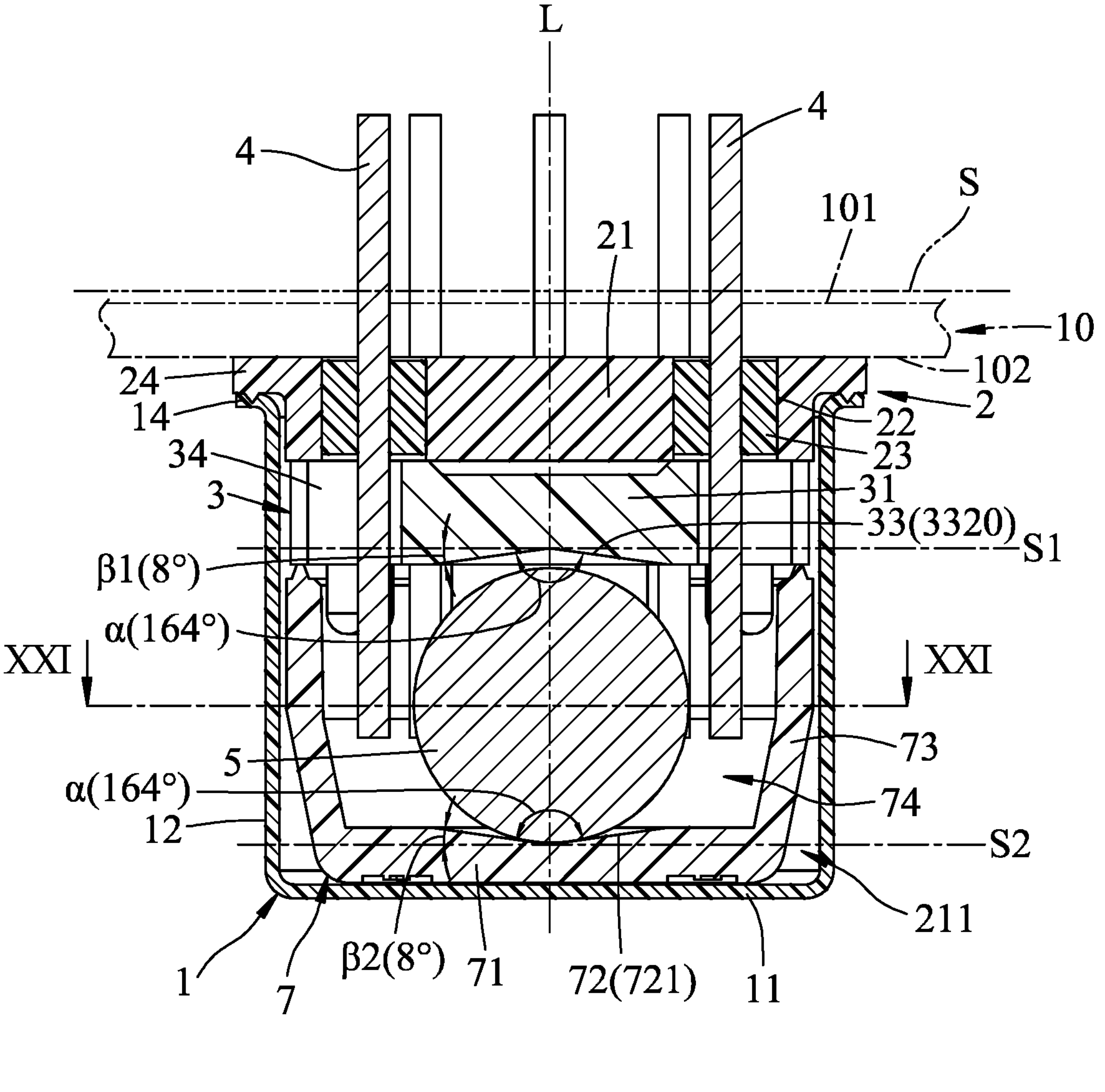
FIG. 20 is a sectional view illustrating the seventh embodiment mounted to a lower surface of a circuit board, and illustrating a conductive ball of the seventh embodiment in a non-conducting state.
Figure 21:
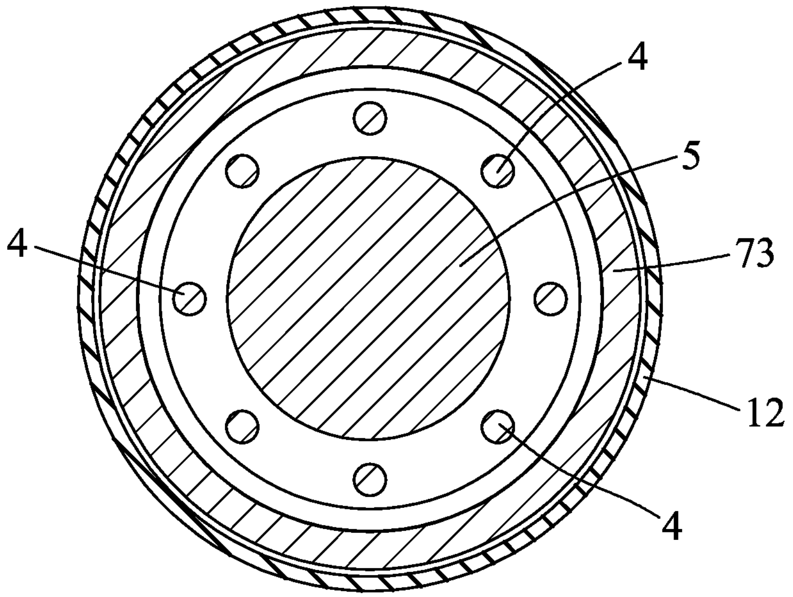
FIG. 21 is a sectional view taken along line XXI-XXI in FIG. 20.
Figure 22:
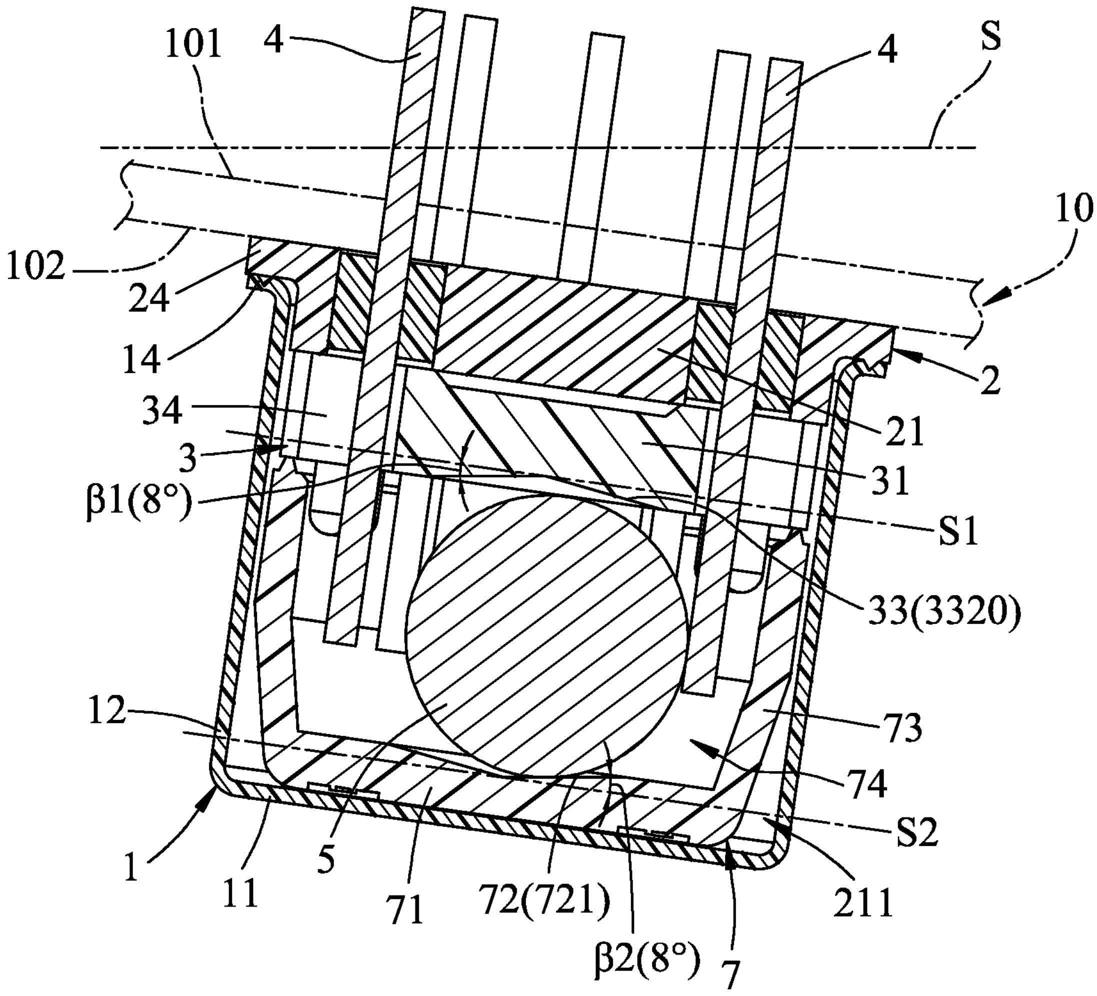
FIG. 22 is a view similar to FIG. 20 but illustrating the conductive ball in a conducting state.

Referring to FIGS. 15 to 17, a sixth embodiment of the tilt ball switch according to the disclosure is generally similar to the first embodiment, but includes a different configuration of the first positioning unit 3. In the sixth embodiment, the first positioning unit 3 includes an annular wall 37 and an annular protrusion 38. The annular wall 37 surrounds the conductive ball 5, is surrounded by the surrounding wall 12, and abuts against the cover body 21 and the base wall 11. The annular protrusion 38 extends inwardly from an end of the annular wall 37 proximate to the cover body 21, and surrounds the conductive members 4. The annular protrusion 38 has a surrounding surface 381 that surrounds the conductive members 4, and an annular inclined surface 382 that extends from the surrounding surface 381 toward the base wall 11, and that tapers toward the cover body 21.

Referring to FIG. 16 again, when the conductive ball 5 is in the conductive state, the conductive ball 5 is in contact with the conductive members 4 and is supported by the conductive members 4. Referring to FIG. 17 again, when the conductive ball 5 is converted from the conducting state into the non-conducting state, the conductive ball 5 rolls away from the conductive members 4 so that the conductive ball 5 is separated from the conductive members 4 when in the non-conducting state. In one embodiment, the conductive ball 5 may roll along the annular inclined surface 382 when rolling away from the conductive members 4.

Referring to FIG. 16 again, when the tilt ball switch is horizontally mounted to the object 100, the conductive ball 5 is in contact with and supported by the conductive members 4, and is in the conducting state such that the tilt ball switch is in the conducting state. Any one of the conductive members 4 is defined to have a supporting point that is in contact with the conductive ball 5 when the one of the conductive members 4 is in contact with the conductive ball 5. When the tilt ball switch is tilted, the conductive ball 5 is mainly supported by lowest two of the conductive members 4. The supporting points of the two of the conductive members 4 cooperatively define an imaginary vertical plane (V) that is perpendicular to the first imaginary horizontal plane (P). When a center of gravity of the conductive ball 5 moves from one side of the imaginary vertical plane (V) proximate to the other two of the conductive members 4 to another side of the imaginary vertical plane (V) distal from the other two of the conductive members 4, the conductive ball 5 is separated from the conductive members 4 (i.e., the conductive ball 5 is not supported by any one of the conductive members 4) and is converted into the non-conducting state. An orientation in which the tilt ball switch is tilted may be detected by detecting the last one or two of the conductive members 4 that is/are in contact with the conductive ball 5.

Referring to FIGS. 18 to 23, a seventh embodiment of the tilt ball switch according to the disclosure is adapted to be mounted to a circuit board 10, and includes an outer housing 1, a cover 2, a first positioning unit 3, a second positioning unit 7, a plurality of conductive members 4, and a conductive ball 5.

The outer housing 1 is made of a metal material. The outer housing 1 includes a base wall 11, a surrounding wall 12 that surrounds the base wall 11, an opening 13 that is formed at one end of the surrounding wall 12 opposite to the base wall 11, and a protruding flange 14 that extends outwardly from a periphery of the surrounding wall 12 proximate to the opening 13.

The cover 2 is made of a metal material, and includes a cover body 21, a plurality of through holes 22, a plurality of sealing members 23, and an abutting wall 24. The cover body 21 closes the opening 13 of the outer housing 1, and is adapted to be mounted to the circuit board 10. The through holes 22 are formed in the cover body 21, are arranged about an axis (L), and respectively correspond in position to the conductive members 4. The sealing members 23 are respectively mounted to the through holes 22. The conductive members 4 respectively extend through the sealing members 23 (i.e., the conductive members 4 respectively extend through the through holes 22). The abutting wall 24 extends outwardly from a periphery of the cover body 21, corresponds in position to the protruding flange 14, and is coupled to the protruding flange 14. The cover body 21 cooperates with the base wall 11 and the surrounding wall 12 to define a receiving space 211.

It is noted that each of the sealing members 23 is configured to be a glass insulator, and is mounted to the respective through hole 22 and the respective conductive member 4 via glass-to-metal sealing technology so that the sealing members 23 and the conductive members 4 may seal the cover body 21. The protruding flange 14 and the abutting wall 24 are coupled to each other by a resistance welding process. The tilt ball switch achieves airtightness and watertightness via the glass-to-metal sealing technology and the resistance welding process.

The first positioning unit 3 is disposed in the receiving space 211, and has a first main portion 31 that abuts against the cover body 21, a first positioning portion 33 that is recessed from a surface of the first main portion 31 opposite to the cover body 21, and a plurality of guiding portions 34 that are formed in a periphery of the first main portion 31 and that surround the axis (L). The first positioning portion 33 of the first positioning unit 3 has a first concave surface 3320 that faces away from the cover body 21. Referring to FIGS. 19 and 20 again, a cross section of the first concave surface 3320 tapers toward the cover body 21, and the first concave surface 3320 is conical. The conductive members 4 respectively extend through the guiding portions 34.

The second positioning unit 7 is disposed in the receiving space 211, abuts against the first positioning unit 3 and the base wall 11, and cooperates with the first positioning unit 3 to define a chamber 74. The second positioning unit 7 has a second main portion 71 that abuts against the base wall 11, a second positioning portion 72 that is recessed from a surface of the second main portion 71 opposite to the base wall 11, and a peripheral wall 73 that surrounds the second main portion 71 and that abuts against the first main portion 31. The second positioning portion 72 has a second concave surface 721 that faces away from the base wall 11. Referring to FIG. 20 again, a cross section of the second concave surface 721 tapers toward the base wall 11. The second concave surface 721 is conical (not visible in FIG. 19 due to the viewing angle). The peripheral wall 73 cooperates with the first main portion 31 and the second main portion 71 to define the chamber 74.

In the seventh embodiment, an apex angle (a) of each of the first concave surface 3320 and the second concave surface 721 is configured to be 164 degrees.

Each of the conductive members 4 is made of a metal material. The conductive members 4 are adapted to be inserted into the circuit board 10, respectively extend through the sealing members 23, and respectively extend through the guiding portions 34 into the chamber 74. The conductive members 4 surround the first positioning portion 33. The second positioning portion 72 is aligned with the first positioning portion 33 along the axis (L).

The conductive ball 5 is made of a metal material, and is movably disposed in the chamber 74.

Referring to FIGS. 20 to 23 again, the seventh embodiment of the tilt ball switch may be mounted to an upper surface 101 of the circuit board 10 such that the conductive ball 5 is in contact with the first positioning unit 3, or to a lower surface 102 of the circuit board 10 such that the conductive ball is in contact with the second positioning unit 7. The conductive ball 5 is rollable relative to the conductive members 4 along the first positioning portion 33 or the second positioning portion 72 when the tilt ball switch and the circuit board 10 are tilted. The conductive ball 5 is convertible between a conducting state, in which the conductive ball 5 is in contact with at least two of the conductive members 4, and a non-conducting state, in which the conductive ball 5 is not in contact with any two of the conductive members 4 simultaneously. In the seventh embodiment, the conductive ball 5 may be in contact with two adjacent ones of the conductive members 4 when in the conducting state, and may be spaced apart from all of the conductive members 4 when in the non-conducting state.

Referring to FIGS. 20 and 21 again, when the tilt ball switch is mounted to the lower surface 102 of the circuit board 10 and when the lower surface 102 is parallel to a second imaginary horizontal plane (S), the conductive ball 5 is positioned by the second positioning portion 72 and spaced apart from the conductive members 4 such that the conductive ball 5 is in the non-conducting state and that the tilt ball switch is in a non-conducting state. It is noted that, because the apex angle ($\alpha$) of each of the first concave surface 3320 and the second concave surface 721 is 164 degrees, the first concave surface 3320 cooperates with a first imaginary plane (S1) that is parallel to the second imaginary horizontal plane (S) at this time to define a first intersection angle ($\beta 1$) of 8 degrees, and the second concave surface 721 cooperates with a second imaginary plane (S2) that is parallel to the second imaginary horizontal plane (S) at this time to define a second intersection angle ($\beta 2$) of 8 degrees. Referring to FIG. 22 again, when the tilt ball switch and the circuit board 10 are tilted over 8 degrees with respect to the second imaginary horizontal plane (S), the conductive ball 5 is urged to roll relative to the second concave surface 721, and is then in contact with two adjacent ones of the conductive members 4 such that the conductive ball 5 is in the conducting state. At this time, the tilt ball switch is in a conducting state.

Figure 23:
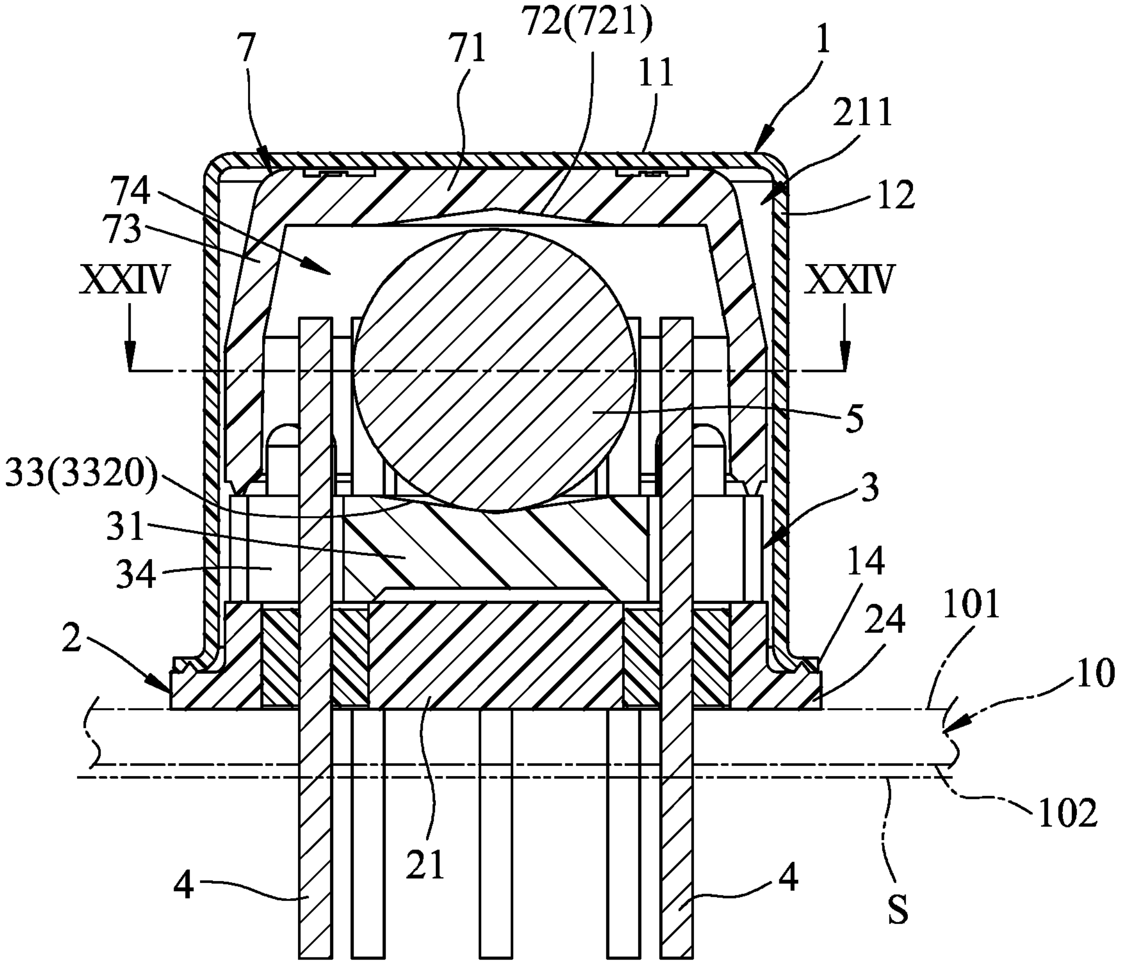
FIG. 23 is a sectional view illustrating the seventh embodiment mounted to an upper surface of the circuit board, and illustrating the conductive ball in the non-conducting state.
Figure 24:
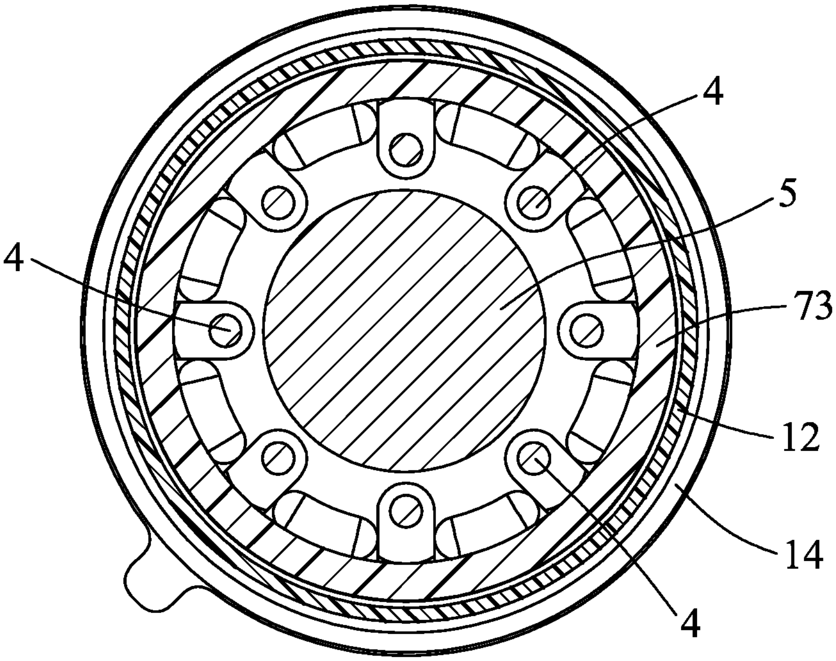
FIG. 24 is a sectional view taken along line XXIV-XXIV in FIG. 23.
Figure 25:
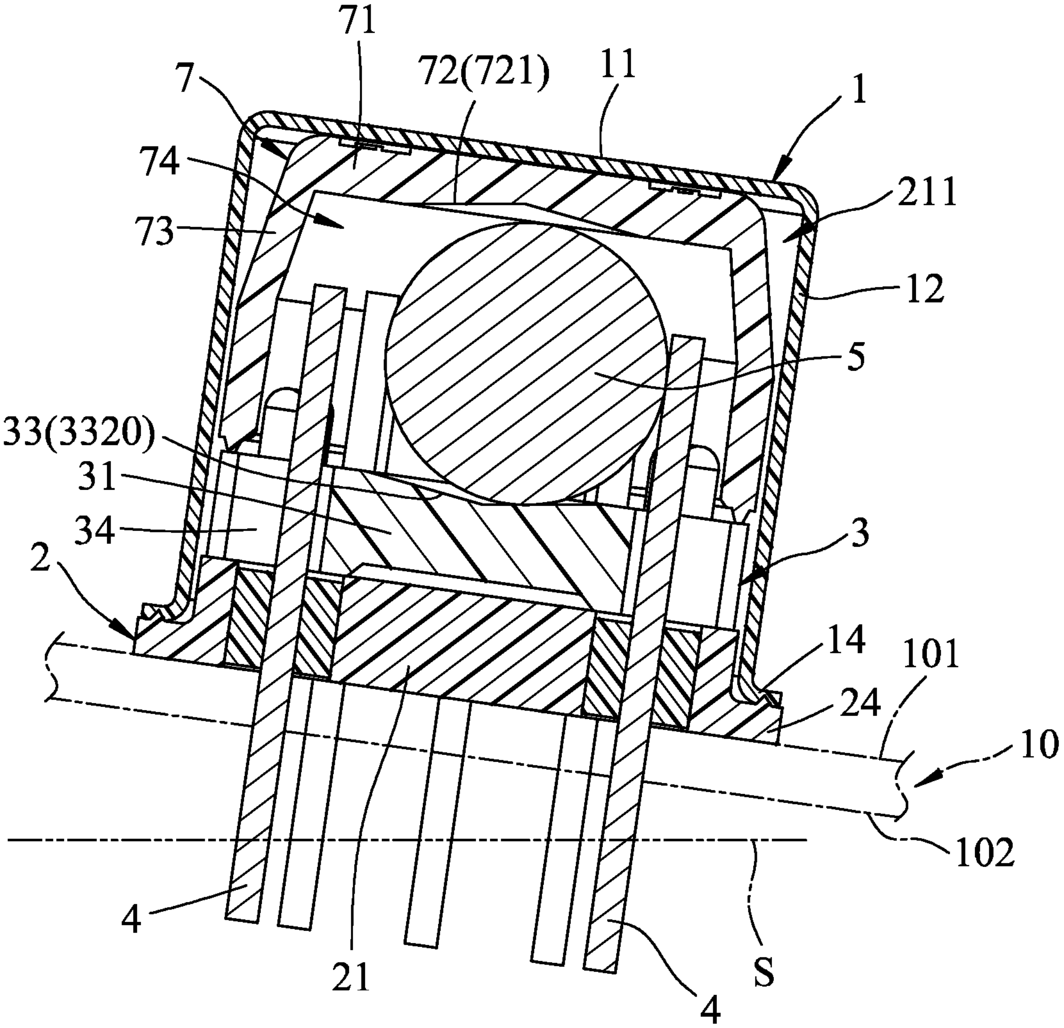
FIG. 25 is a view similar to FIG. 23 but illustrating the conductive ball in the conducting state.

Referring further to FIG. 24, in cooperation with FIG. 23, when the tilt ball switch is mounted to the upper surface 101 of the circuit board 10 and when the upper surface 101 is parallel to the second imaginary horizontal plane (S), the conductive ball 5 is positioned by the first positioning portion 33 and spaced apart from the conductive members 4 such that the conductive ball 5 is in the non-conducting state and that the tilt ball switch is in the non-conducting state. Referring further to FIG. 25, when the tilt ball switch and the circuit board 10 are tilted over 8 degrees with respect to the second imaginary horizontal plane (S), the conductive ball 5 is urged to roll relative to the first concave surface 3320, and is then in contact with two adjacent ones of the conductive members 4 such that the conductive ball 5 is in the conducting state. At this time, the tilt ball switch is in the conducting state.

No matter which one of the upper and lower surfaces 101, 102 of the circuit board 10 that the tilt ball switch is mounted to, as long as the tilt ball switch and the circuit board 10 are tilted within 8 degrees with respect to the second imaginary horizontal plane (S), the conductive ball 5 may not roll relative to the first concave surface 3320/the second concave surface 721 and will not be in contact with any two of the conductive members 4 simultaneously. At this time, the conductive ball 5 is in the non-conducting state such that the tilt ball switch is in the non-conducting state.

According to the abovementioned description, benefits of the seventh embodiment are analyzed and listed as below:

a) Because the tilt ball switch has two positioning portions (i.e., the first and second positioning portions 33, 71), and because the conductive ball 5 is rollable along any one of the first and second positioning portions 33, 71 relative to the conductive members 4, the tilt ball switch may function when being mounted to any one of the upper and lower surfaces 101, 102 of the circuit board 10.

b) By virtue of the first and second concave surfaces 3320, 721 respectively cooperating with the first and second imaginary planes (S1, S2) to respectively define the first and second intersection angles ($\beta 1$, $\beta 2$), as long as the tilt ball switch that is mounted to the upper surface 101 is tilted within the first intersection angle ($\beta 1$) with respect to the second imaginary horizontal plane (S), or as long as the tilt ball switch that is mounted to the lower surface 102 is tilted within the second intersection angle (β2) with respect to the second imaginary horizontal plane (S), the tilt ball switch may be kept in the non-conducting state.

c) Because two adjacent ones of the conductive members 4 that are in contact with the conductive ball 5 may define one orientation, when the conductive ball 5 is in the conducting state, an orientation in which the tilt ball switch is tilted may be detected.

Figure 26:
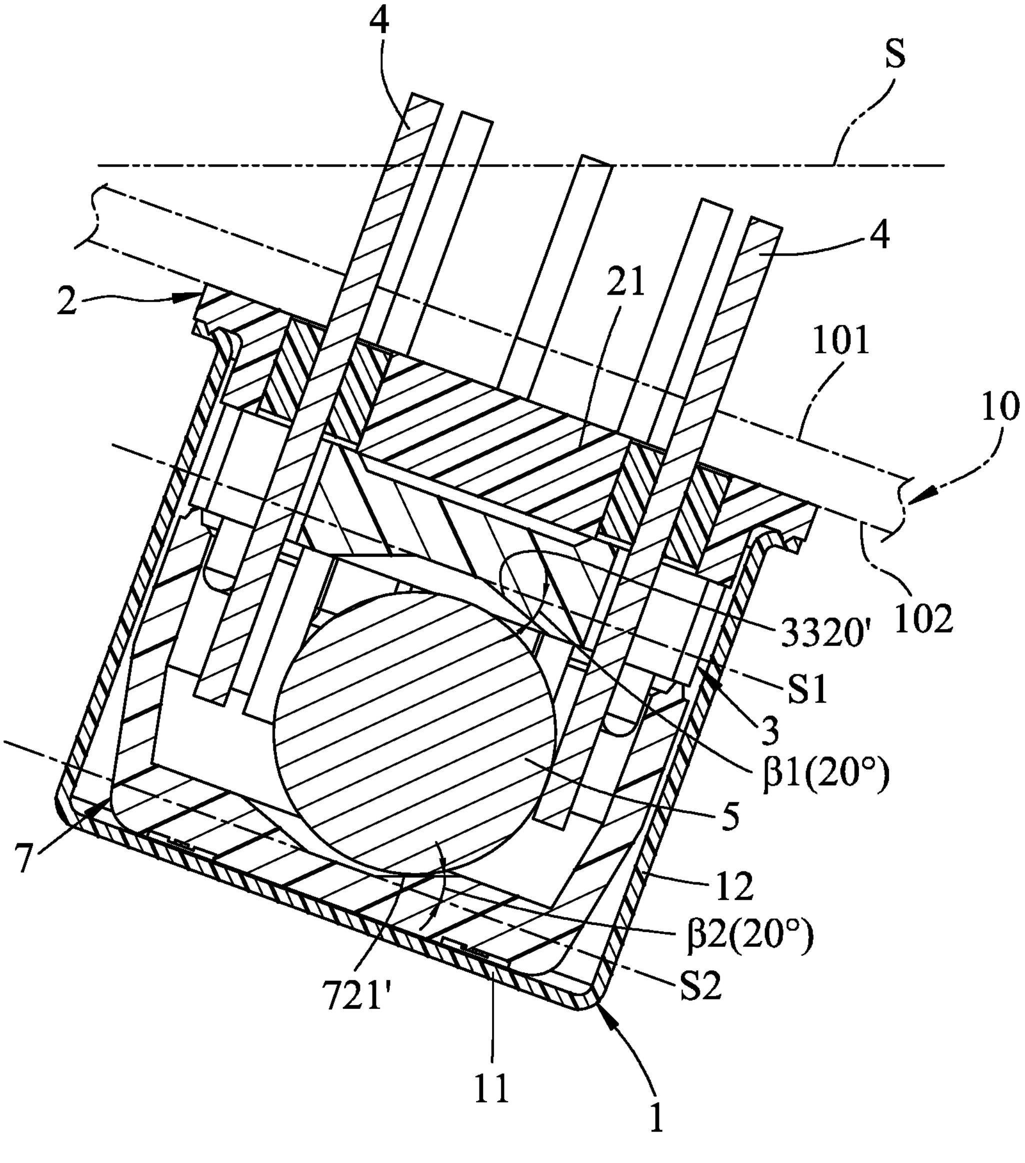
FIG. 26 is a sectional view of an eighth embodiment of the tilt ball switch according to the disclosure, illustrating the eighth embodiment mounted to the lower surface of the circuit board, and illustrating a conductive ball of the eighth embodiment in a conducting state.

Referring to FIG. 26, an eighth embodiment of the tilt ball switch according to the disclosure is generally similar to the seventh embodiment, but includes a different configuration of each of the first positioning unit 3 and the second positioning unit 7. The first positioning unit 3 has a first concave surface 3320' and the second positioning unit 7 has a second concave surface 721'. Specifically, each of the first and second concave surfaces 3320', 721' is frustoconical. The first concave surface 3320' cooperates with the first imaginary plane (S1) to define a first intersection angle (β1) of 20 degrees, and the second concave surface 721 cooperates with the second imaginary plane (S2) to define a second intersection angle (β2) of 20 degrees. When the tilt ball switch and the circuit board 10 are tilted over 20 degrees with respect to the second imaginary horizontal plane (S), the conductive ball 5 is urged to roll relative to the second concave surface 721', and is then in contact with two adjacent ones of the conductive members 4 such that the conductive ball 5 is in the conducting state and that the tilt ball switch is in the conducting state.

When the tilt ball switch and the circuit board 10 are tilted within 20 degrees with respect to the second imaginary horizontal plane (S), the conductive ball 5 is not in contact with any two of the conductive members 4 simultaneously such that the conductive ball 5 is in the non-conducting state and that the tilt ball switch is in the non-conducting state.

In certain modifications of the seventh or eighth embodiments, each of the first and second intersection angles (β1, β2) may not be limited to 8 or 20 degrees. The greater the first/second intersection angle (β1/β2), the greater the degrees that the circuit board 10 and the tilt ball switch have to be tilted over to convert the conductive ball 5 into the conducting state. Sensitivity of the tilt ball switch may be adjusted by adjusting each of the first and second intersection angles (β1, β2) to meet different user requirements.

Therefore, the eighth embodiment may achieve the same purpose and effects as the seventh embodiment.

Figure 27:
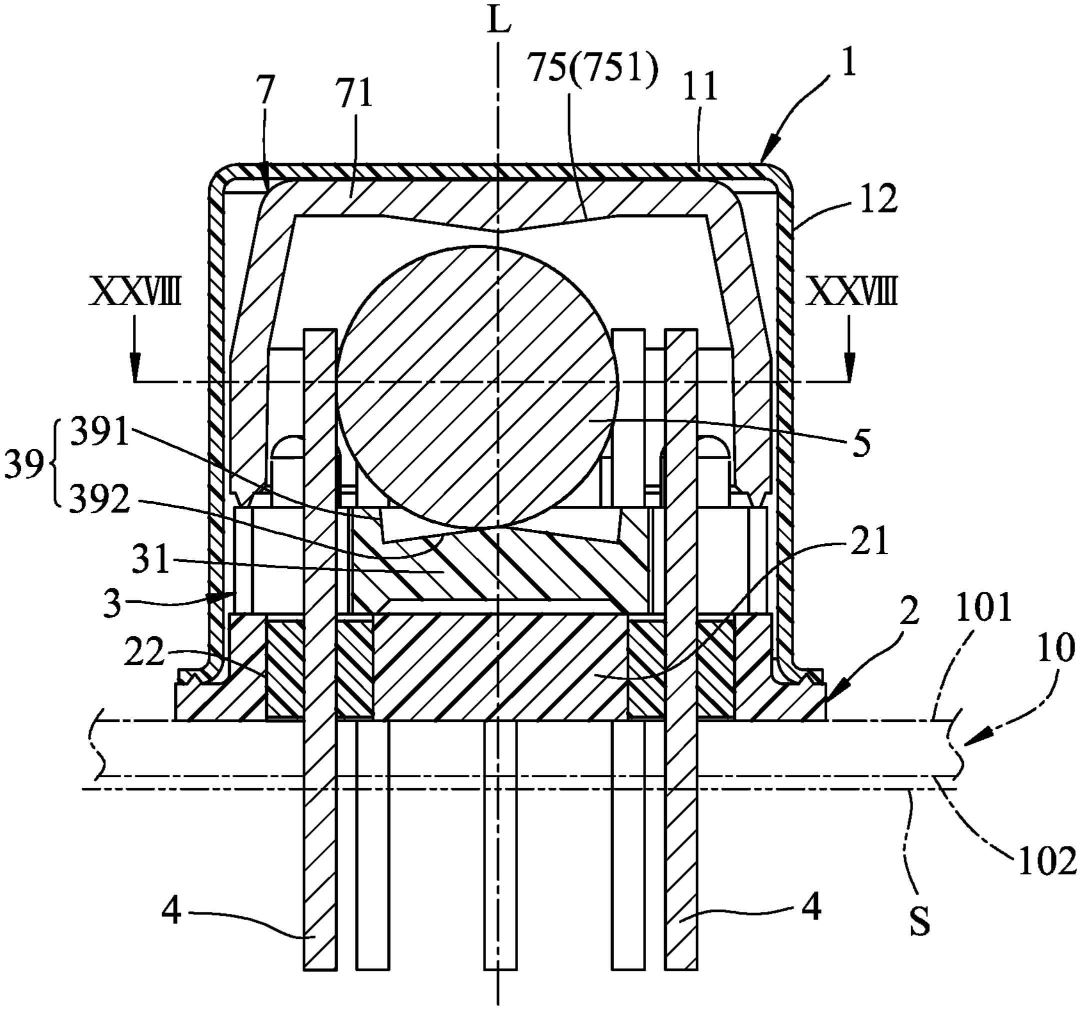
FIG. 27 is a sectional view of a ninth embodiment of the tilt ball switch according to the disclosure, illustrating the ninth embodiment mounted to the upper surface of the circuit board, and illustrating a conductive ball of the ninth embodiment in a conducting state.
Figure 28:
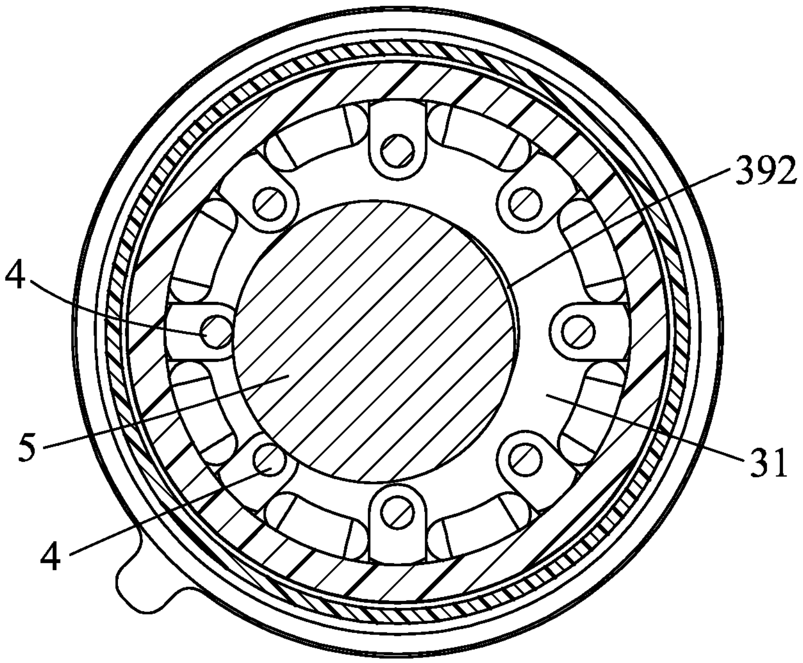
FIG. 28 is a sectional view taken along line XXVIII-XXVIII in FIG. 27.
Figure 29:
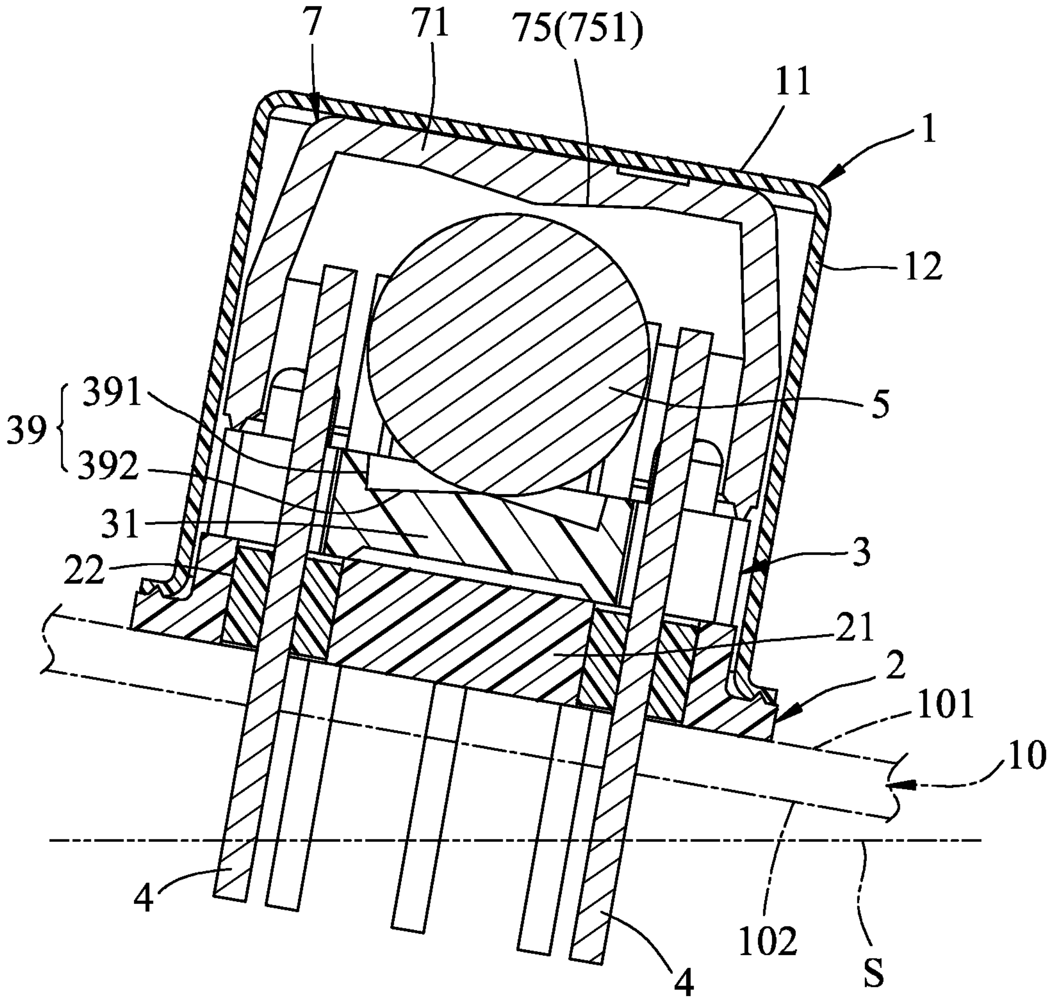
FIG. 29 is a view similar to FIG. 27 but illustrating the conductive ball in a non-conducting state.

Referring to FIGS. 27 to 29, a ninth embodiment of the tilt ball switch according to the disclosure is similar to the seventh embodiment, but includes a different configuration of each of the first positioning unit 3 and the second positioning unit 7.

The first positioning unit 3 has a first main portion 31 that abuts against the cover body 21, and a first positioning portion 39 that is recessed from a surface of the first main portion 31 opposite to the cover body 21. The second positioning unit 7 has a second main portion 71 that abuts against the base wall 11, and a protrusion portion 75 that protrudes from a surface of the second main portion 71 opposite to the base wall 11. The first positioning portion 39 of the first positioning unit 3 has a first convex surface 392 that faces away from the cover body 21, and a surrounding surface 391 that interconnects a periphery of the first convex surface 392 and the surface of the first main portion 31 opposite to the cover body 21. The surrounding surface 391 surrounds and faces the axis (L). The protrusion portion 75 of the second positioning unit 7 has a second convex surface 751 that faces away from the base wall 11. A cross section of the first convex surface 392 tapers toward the base wall 11. A cross section of the second convex surface 751 tapers toward the cover body 21. Each of the first convex surface 392 and the second convex surface 751 is conical.

Referring to FIGS. 27 and 28 again, when the tilt ball switch is mounted to the upper surface 101 of the circuit board 10 and when the upper surface 101 is parallel to the second imaginary horizontal plane (S), the conductive ball 5 is in contact with the first positioning portion 39 and two adjacent ones of the conductive members 4 because the cross section of the first convex surface 392 tapers upwardly and because of gravity. At this time, the conductive ball 5 is positioned by the first positioning unit 3 and is kept in the conducting state such that the tilt ball switch is in the conducting state.

Referring to FIG. 29 again, when an external force is exerted on the tilt ball switch and the circuit board 10, the tilt ball switch and the circuit board 10 may be tilted such that conductive ball 5 is moved relative to the first convex surface 392 (i.e., the conductive ball 5 rolls away from the two adjacent ones of the conductive members 4). At this time, the conductive ball 5 is not in contact with any two of the conductive members 4 simultaneously (i.e., the conductive ball 5 may be spaced apart from all of the conductive members 4, or may be in contact with only one of the conductive members 4) such that the conductive ball 5 is converted into the non-conducting state.

It is noted that, when the tilt ball switch is mounted to the lower surface 102 of the circuit board 10, the conductive ball 5 is in contact with the protrusion portion 75, and is rollable along the protrusion portion 75 relative to the conductive members 4 so that the conductive ball 5 is convertible between the conducting and non-conducting states. The tilt ball switch is thus convertible between the conducting and non-conducting states.

Therefore, the ninth embodiment may achieve the same purpose and effects as the seventh and eighth embodiments. One of the benefits of the ninth embodiment is analyzed and listed as below Because the tilt ball switch has the first positioning portion 39 and the protrusion portion 75, and because the conductive ball 5 is rollable along any one of the first positioning portion 39 and the protrusion portion 75 relative to the conductive members 4, the tilt ball switch may function when being mounted to any one of the upper and lower surfaces 101, 102 of the circuit board 10.

In summary, by virtue of the first positioning unit 3 in each of the embodiments, the conductive ball 5 is convertible between the non-conducting state and the conducting state when the tilt ball switch is tilted or affected by an external force so that the tilt ball switch is convertible between the non-conducting state and the conducting state. Via the glass-to-metal sealing technology and the resistance welding process, the tilt ball switch achieves airtightness and watertightness. Moreover, the overall structure of each of the embodiments of the tilt ball switch and the manufacturing of the tilt ball switch are relatively simple. Therefore, the purpose of the disclosure is achieved.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A tilt ball switch comprising:

an outer housing including a base wall, a surrounding wall that extends from a periphery of the base wall, and an opening that is formed at one end of the surrounding wall opposite to the base wall;

a cover closing the opening of the outer housing, and cooperating with the base wall and the surrounding wall to define a receiving space;

a first positioning unit disposed in the receiving space, and positioned between the base wall and the cover;

a plurality of conductive members extending through the cover into the receiving space; and a conductive ball movably disposed in the receiving space, and convertible between a conducting state, in which the conductive ball is in contact with at least two of the plurality of conductive members, and a non-conducting state, in which the conductive ball is spaced apart from the plurality of conductive members, the first positioning unit being for positioning the conductive ball to keep the conductive ball in one of the conducting state and the non-conducting state;

wherein the first positioning unit has a first main portion that abuts against the cover, a plurality of arm portions that extend from the first main portion and that abut against the base wall, a first positioning portion that is recessed from a surface of the first main portion opposite to the cover, and a plurality of guiding portions that surround the first positioning portion, the plurality of conductive members extending through the plurality of guiding portions, when the conductive ball is in the non-conducting state, the conductive ball being positioned by the first positioning portion and being spaced apart from the plurality of conductive members, when the conductive ball is in the conducting state, the conductive ball being moved relative to the first positioning portion and being in contact with two of the plurality of conductive members.

2. The tilt ball switch as claimed in claim 1, wherein the cover includes a cover body, a plurality of through holes that are formed in the cover body and that respectively correspond in position to the plurality of conductive members, and a plurality of sealing members that are respectively mounted to the plurality of through holes, the plurality of conductive members respectively extending through the plurality of sealing members.

3. The tilt ball switch as claimed in claim 2, wherein the outer housing further includes a protruding flange that extends outwardly from a periphery of the surrounding wall proximate to the opening, the cover further including an abutting wall that extends outwardly from a periphery of the cover body, that corresponds in position to the protruding flange, and that is coupled to the protruding flange.

4. A tilt ball switch mounted to a circuit board, the tilt ball switch comprising:

an outer housing including a base wall, a surrounding wall that surrounds the base wall, and an opening that is formed at one end of the surrounding wall opposite to the base wall;

a cover including a cover body that closes the opening of the outer housing and that is adapted to be mounted to the circuit board, and a plurality of through holes that are formed in the cover body, the cover body cooperating with the base wall and the surrounding wall to define a receiving space;

a first positioning unit disposed in the receiving space and abutting against the cover body;

a second positioning unit disposed in the receiving space, abutting against the first positioning unit and the base wall, and cooperating with the first positioning unit to define a chamber;

a plurality of conductive members adapted to be inserted into the circuit board, respectively extending through the plurality of through holes of the cover, and extending through the first positioning unit into the chamber; and a conductive ball movably disposed in the chamber, in contact with one of the first positioning unit and the second positioning unit, and convertible between a conducting state, in which the conductive ball is in contact with at least two of the plurality of conductive members, and a non-conducting state, in which the conductive ball is not in contact with any two of the plurality of conductive members simultaneously.

5. The tilt ball switch as claimed in claim 4, wherein the first positioning unit has a first main portion that abuts against the cover body, and a first positioning portion that is recessed from a surface of the first main portion opposite to the cover body, the second positioning unit having a second main portion that abuts against the base wall of the outer casing, and a protrusion portion that protrudes from a surface of the second main portion opposite to the base wall, when the conductive ball is in the conducting state, the conductive ball being in contact with one of the first positioning portion and the protrusion portion, and two of the plurality of conductive members, the conductive ball being converted into the non-conducting state when the conductive ball is moved relative to the one of the first positioning portion and the protrusion portion and is not in contact with any two of the plurality of conductive members simultaneously.

6. The tilt ball switch as claimed in claim 5, wherein the first positioning portion of the first positioning unit has a first convex surface that faces away from the cover body, and a surrounding surface that interconnects a periphery of the first convex surface and the surface of the first main portion opposite to the cover body, the protrusion portion of the second positioning unit having a second convex surface that faces away from the base wall, a cross section of the first convex surface tapering toward the base wall, a cross section of the second convex surface tapering toward the cover body.

7. The tilt ball switch as claimed in claim 5, wherein the second positioning unit further has a peripheral wall that surrounds the second main portion, that abuts against the first main portion of the first positioning unit, and that cooperates with the first main portion and the second main portion to define the chamber.

8. The tilt ball switch as claimed in claim 4, wherein the first positioning unit has a first main portion that abuts against the cover body, and a first positioning portion that is recessed from a surface of the first main portion opposite to the cover body, the second positioning unit having a second main portion that abuts against the base wall of the outer casing, and a second positioning portion that is recessed from a surface of the second main portion opposite to the base wall, when the conductive ball is in the non-conducting state, the conductive ball being positioned by one of the first positioning portion and the second positioning portion, and being spaced apart from the plurality of conductive members, when the conductive ball is in the conducting state, the conductive ball being moved relative to the one of the first positioning portion and the second positioning portion, and being in contact with two of the plurality of conductive members.

9. The tilt ball switch as claimed in claim 8, wherein the second positioning unit further has a peripheral wall that surrounds the second main portion, that abuts against the first main portion of the first positioning unit, and that cooperates with the first main portion and the second main portion to define the chamber.

10. The tilt ball switch as claimed in claim 8, wherein the first positioning portion of the first positioning unit has a first concave surface that faces away from the cover body, the second positioning portion of the second positioning unit having a second concave surface that faces away from the base wall, a cross section of the first concave surface tapering toward the cover body, a cross section of the second concave surface tapering toward the base wall.

11. The tilt ball switch as claimed in claim 10, wherein each of the first concave surface and the second concave surface is conical.

12. A tilt ball switch comprising:

an outer housing including a base wall, a surrounding wall that extends from a periphery of the base wall, and an opening that is formed at one end of the surrounding wall opposite to the base wall;

a cover closing the opening of the outer housing, and cooperating with the base wall and the surrounding wall to define a receiving space;

a first positioning unit disposed in the receiving space, and positioned between the base wall and the cover;

a plurality of conductive members extending through the cover into the receiving space; and a conductive ball movably disposed in the receiving space, and convertible between a conducting state, in which the conductive ball is in contact with at least two of the plurality of conductive members, and a non-conducting state, in which the conductive ball is spaced apart from the plurality of conductive members, the first positioning unit being for positioning the conductive ball to keep the conductive ball in one of the conducting state and the non-conducting state;

wherein the first positioning unit has a first main portion that abuts against one of the cover and the base wall, a plurality of arm portions that extend from the first main portion and that abut against the other one of the cover and the base wall, an accommodating portion that is formed at a surface of the first main portion opposite to the conductive ball, a magnetic member that is disposed on the accommodating portion and that attracts the conductive ball, and a plurality of guiding portions that are formed in the first main portion and that surround the accommodating portion, when the conductive ball is in the non-conducting state, the conductive ball being attracted by the magnetic member such that the conductive ball abuts against another surface of the first main portion opposite to the accommodating portion and is spaced apart from the plurality of conductive members, when the conductive ball is in the conducting state, the conductive ball being moved against attraction forces of the magnetic member and being in contact with two of the plurality of conductive members.

13. The tilt ball switch as claimed in claim 12, wherein the cover includes a cover body, a plurality of through holes that are formed in the cover body and that respectively correspond in position to the plurality of conductive members, and a plurality of sealing members that are respectively mounted to the plurality of through holes, the plurality of conductive members respectively extending through the plurality of sealing members.

14. The tilt ball switch as claimed in claim 13, wherein the outer housing further includes a protruding flange that extends outwardly from a periphery of the surrounding wall proximate to the opening, the cover further including an abutting wall that extends outwardly from a periphery of the cover body, that corresponds in position to the protruding flange, and that is coupled to the protruding flange.

15. A tilt ball switch comprising:

an outer housing including a base wall, a surrounding wall that extends from a periphery of the base wall, and an opening that is formed at one end of the surrounding wall opposite to the base wall;

a cover closing the opening of the outer housing, and cooperating with the base wall and the surrounding wall to define a receiving space;

a first positioning unit disposed in the receiving space, and positioned between the base wall and the cover;

a plurality of conductive members extending through the cover into the receiving space;

a conductive ball movably disposed in the receiving space, and convertible between a conducting state, in which the conductive ball is in contact with at least two of the plurality of conductive members, and a non-conducting state, in which the conductive ball is spaced apart from the plurality of conductive members, the first positioning unit being for positioning the conductive ball to keep the conductive ball in one of the conducting state and the non-conducting state; and a separating unit disposed in the receiving space, and abutting against one of the cover and the base wall, the separating unit including a separating member that has a receiving section formed at a surface thereof opposite to the conductive ball, and a magnetic member that is disposed on the receiving section, the first positioning unit having a first main portion that abuts against the other one of the cover and the base wall and that is located at one side of the conductive ball opposite to the separating unit, a plurality of arm portions that extend from the first main portion and that abut against the separating unit, an accommodating portion that is formed at a surface of the first main portion opposite to the conductive ball, a magnetic member that is disposed on the accommodating portion, and a plurality of guiding portions that are formed in the first main portion and that surround the accommodating portion, when the conductive ball is in the non-conducting state, the conductive ball being suspended between the first main portion and the separating unit by attraction forces of the magnetic member of the separating unit and the magnetic member of the first positioning unit, and being spaced apart from the plurality of conductive members, when the conductive ball is in the conducting state, the conductive ball being moved against the attraction forces of the magnetic member of the first positioning unit and the magnetic member of the separating unit, and being in contact with two of the plurality of conductive members.

16. The tilt ball switch as claimed in claim 15, wherein the cover includes a cover body, a plurality of through holes that are formed in the cover body and that respectively correspond in position to the plurality of conductive members, and a plurality of sealing members that are respectively mounted to the plurality of through holes, the plurality of conductive members respectively extending through the plurality of sealing members.

17. The tilt ball switch as claimed in claim 16, wherein the outer housing further includes a protruding flange that extends outwardly from a periphery of the surrounding wall proximate to the opening, the cover further including an abutting wall that extends outwardly from a periphery of the cover body, that corresponds in position to the protruding flange, and that is coupled to the protruding flange.

18. A tilt ball switch comprising:

an outer housing including a base wall, a surrounding wall that extends from a periphery of the base wall, and an opening that is formed at one end of the surrounding wall opposite to the base wall;

a cover closing the opening of the outer housing, and cooperating with the base wall and the surrounding wall to define a receiving space;

a first positioning unit disposed in the receiving space, and positioned between the base wall and the cover;

a plurality of conductive members extending through the cover into the receiving space; and a conductive ball movably disposed in the receiving space, and convertible between a conducting state, in which the conductive ball is in contact with at least two of the plurality of conductive members, and a non-conducting state, in which the conductive ball is spaced apart from the plurality of conductive members, the first positioning unit being for positioning the conductive ball to keep the conductive ball in one of the conducting state and the non-conducting state;

wherein the first positioning unit includes an annular wall that surrounds the conductive ball, that is surrounded by the surrounding wall and that abuts against the cover and the base wall, and an annular protrusion that extends inwardly from an end of the annular wall proximate to the cover and that surrounds the plurality of conductive members, the annular protrusion having a surrounding surface that surrounds the plurality of conductive members, and an annular inclined surface that extends from the surrounding surface toward the base wall and that tapers toward the cover, when the conductive ball is in the conducting state, the conductive ball being in contact with the plurality of conductive members and being supported by the plurality of conductive members, when the conductive ball is converted from the conducting state into the non-conducting state, the conductive ball rolling away from the plurality of conductive members so that the conductive ball is separated from the plurality of conductive members when in the non-conducting state.

19. The tilt ball switch as claimed in claim 18, wherein the cover includes a cover body, a plurality of through holes that are formed in the cover body and that respectively correspond in position to the plurality of conductive members, and a plurality of sealing members that are respectively mounted to the plurality of through holes, the plurality of conductive members respectively extending through the plurality of sealing members.

20. The tilt ball switch as claimed in claim 19, wherein the outer housing further includes a protruding flange that extends outwardly from a periphery of the surrounding wall proximate to the opening, the cover further including an abutting wall that extends outwardly from a periphery of the cover body, that corresponds in position to the protruding flange, and that is coupled to the protruding flange.

* * * * *